US006237049B1

(12) United States Patent
Ludtke

(10) Patent No.: US 6,237,049 B1
(45) Date of Patent: May 22, 2001

(54) METHOD AND SYSTEM FOR DEFINING AND DISCOVERING PROXY FUNCTIONALITY ON A DISTRIBUTED AUDIO VIDEO NETWORK

(75) Inventor: Harold Aaron Ludtke, San Jose, CA (US)

(73) Assignees: Sony Corporation of Japan, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/151,373

(22) Filed: Sep. 10, 1998

Related U.S. Application Data

(63) Continuation-in-part of application No. 09/003,119, filed on Jan. 6, 1998, now Pat. No. 6,032,202.

(51) Int. Cl.$^7$ ...................................................... H04N 7/173
(52) U.S. Cl. .............................. 710/8; 725/118; 725/120; 725/131; 725/134
(58) Field of Search .......................... 348/8, 6; 455/6.2, 455/6.3; 700/8, 9; 709/208, 217, 218, 219, 213, 216, 229, 249; 340/825.25, 825.24; 710/8, 101

(56) References Cited

U.S. PATENT DOCUMENTS

| 5,457,478 | * | 10/1995 | Frank .................................... 345/158 |
| 5,790,423 | | 8/1998 | Lau et al. .......................... 364/514 R |
| 5,798,922 | | 8/1998 | Wood et al. .......................... 364/400 |
| 5,940,600 | * | 8/1999 | Staats et al. .......................... 395/287 |
| 6,032,202 | * | 2/2000 | Lea et al. .................................... 710/8 |
| 6,038,625 | * | 3/2000 | Ogino et al. .......................... 710/104 |
| 6,052,750 | * | 4/2000 | Lea .......................................... 710/72 |

FOREIGN PATENT DOCUMENTS

| WO97/37202 | 10/1987 | (WO) .............................. G01L/3/00 |
| WO99/35856 | 7/1999 | (WO) .............................. H04L/12/18 |

OTHER PUBLICATIONS

Moses et al., Audio Distribution and Control using the IEEE 1394 Serial Bus—p. 5of 15, 1998.*
Jason Krause: "What the Hell is . . . Jini", The Industry Standard, Online! retrived on Apr. 23, 1999, the whole document.
Wray S. et al. "Networked Multimedia: The Medusa Environment"IEEE Multimedia, US, IEEE Computer Society, vol. 1, No. 4, pp. 54–63.

* cited by examiner

Primary Examiner—Andrew Faile
Assistant Examiner—Kieu-Oanh Bui
(74) Attorney, Agent, or Firm—Wagner, Murabito & Hao LLP

(57) ABSTRACT

A method and system for defining and discovering proxy functionality on a distributed audio video network. The present invention operates within a network of consumer electronic media devices (e.g., television, set-top-box, video cassette recorder, compact disc device, personal computer system, etc.) that are coupled together using the IEEE 1394 serial communication standard. Specifically, the present invention enables a consumer electronic media device having increased functionality to act as a proxy device for other consumer electronic media devices. As such, the proxy device is able to provide a wide variety of advantageous proxy services for other consumer electronic media devices thereby increasing their original capabilities. For instance, the proxy device can act as a translator between two devices thereby enabling them to communicate. Additionally, the proxy device can enable Home Audio Video Interoperability (HAVi) devices to have greater control over non-HAVi devices. Moreover, the proxy device can extend the existing functionality of devices as well as provide new functionality for them. Furthermore, the proxy device can act as a command arbitrator for particular devices. Also, the proxy device can act as a proxy for all or a portion of the functionality of a device. It is appreciated that these are only examples of the possible advantageous proxy services that the proxy device can provide for other devices in accordance with the present invention.

37 Claims, 17 Drawing Sheets

METHOD AND SYSTEM FOR DEFINING AND DISCOVERING PROXY FUNCTIONALITY ON A DISTRIBUTED AUDIO VIDEO NETWORK

CROSS REFERENCE TO RELATED APPLICATIONS

This is a continuation-in-part of U.S. application Ser. No. 09/003,119, now U.S. Pat. No. 6,032,202 entitled "Home Audio/Video Network with Two Level Device Control" by Rodger J. Lea et al., filed Jan. 6, 1998.

TECHNICAL FIELD

The present invention relates to the field of consumer electronic devices. More specifically, the present invention relates to the field of networked consumer electronic media devices.

BACKGROUND ART

The typical home entertainment system consists of a variety of different consumer electronic devices which present and record audio/visual media in different ways. For instance, consumer electronic media devices include television (TV) sets, compact disc (CD) players, set-top-boxes, digital video disc (DVD) players, personal computer (PC) systems, video cameras, video cassette recorders (VCRs), and the like. Furthermore, there are several different ways to communicatively couple together these types of consumer electronic media devices.

Recently, a class of consumer electronic media devices has been introduced that can be networked together using a standard communication protocol layer (e.g., IEEE 1394 communication standard). The IEEE 1394 standard is an international standard for implementing an inexpensive high-speed serial bus architecture which supports both asynchronous and isochronous format data transfers. The IEEE 1394 standard provides a high-speed serial bus for interconnecting digital devices thereby providing universal input/output connection. The IEEE 1394 standard defines a digital interface for applications thereby eliminating the need for an application to covert digital data to an analog form before it is transmitted across the bus. Correspondingly, a receiving application will receive digital data from the bus, not analog data and will therefore not be required to convert analog data to digital form. The IEEE 1394 standard is ideal for consumer electronics communication in part because devices can be added to or removed from the serial bus while the bus is active. If a device is so added or removed, the bus automatically reconfigures itself for transmitting data between the then existing devices. Each device on the bus is a "node" and contains its own address space.

The provision of the IEEE 1394 serial communication bus for networking consumer electronic devices has introduced a powerful new platform on which device functionality and inter-operability can be built. But there are disadvantages associated with consumer electronic media devices networked together by the IEEE 1394 serial bus. One disadvantage is that some consumer electronic media devices are unable to communicate with other devices, thereby rendering them incompatible. These communication incompatibilities arise because there are many different companies, standard bodies, and organizations utilizing the IEEE 1394 bus for varying purposes. For instance, different consumer electronic media devices can utilize different communication protocols while being compliant with the IEEE 1394 bus. As a result, some consumer electronic media devices are unable to communicate even though they are designed to be compliant with the IEEE 1394 bus. This results in a very unpleasant experience for a customer who owns two or more consumer electronic media devices (e.g., a set-top-box and a VCR) which are unable to function together because they communicate using different protocols.

Another disadvantage associated with consumer electronic media devices networked together by the IEEE 1394 serial bus is that some existing devices are not upgradeable in the field when new technology is developed. As such, the non-upgradeable consumer electronic media devices are typically unable to benefit from the new technology, thereby limiting the overall functionality provided to their users. Furthermore, as technology for the IEEE 1394 bus continues to improve and change, the non-upgradeable consumer electronic media devices could eventually be unable to communicate with other consumer electronic media devices utilizing the IEEE 1394 bus.

Furthermore, another disadvantage associated with consumer electronic media devices networked together by the 1394 serial bus is that some types of consumer electronic media devices are so limited in resources that they are unable to provide certain features or capabilities which are or later become useful or desirable to their users. This disadvantage is typically associated with consumer electronic media devices which are specifically manufactured with limited resources in order to be competitively priced for consumers. For example, an inexpensive VCR is typically only fabricated with a minimal amount of Read Only Memory (ROM) enabling it to perform its basic functionality. As such, the VCR is unable to provide its user other desirable capabilities and functions. Therefore, consumer electronic media devices having limited resources can by their nature only provided limited functionality to their users.

Another disadvantage associated with consumer electronic media devices networked together by the 1394 serial bus is that some of them are accidentally manufactured with defects or "bugs" within their software. As such, the defective software inhibits the normal operation of the consumer electronic media devices according to their given set of operational specifications. Consequently, the defective consumer electronic media devices are typically returned in order to correct any defects within the software because they are not ordinarily correctable in the field. In the end, an owner of a defective consumer electronic media device typically expends time and/or money rectifying the defect.

Accordingly, it would be advantageous to provide a method and system that enables incompatible consumer electronic media devices networked together by the IEEE 1394 serial communication bus to communicate with each other. Furthermore, it would be advantageous to provide a method and system that enables new functionality to be provided in the field to existing consumer electronic media devices networked together by the IEEE 1394 serial communication bus. Moreover, it would be advantageous to provide a method and system that enables consumer electronic media devices manufactured with limited resources, which are networked together by the IEEE 1394 serial communication bus, to exhibit increased functionality for their users. Additionally, it would be advantageous to provide a method and system that enables defective software utilized within consumer electronic media devices, which are networked together by the IEEE 1394 serial communication bus, to be corrected or updated in the field. The present invention provides these advantages. These and other advantages of the present invention not specifically mentioned above will become clear within discussions of the present invention presented herein.

DISCLOSURE OF THE INVENTION

The present invention includes a method and system for defining and discovering proxy functionality on a distributed audio video network. The present invention operates within a network of consumer electronic media devices, e.g., television (TV), set-top-box, digital video disc (DVD) player, video cassette recorder (VCR), compact disc (CD) device, personal computer system (PC), video camera, etc., that are coupled together using a common communication bus, e.g., the IEEE 1394 serial communication standard. Specifically, the present invention enables a consumer electronic media device having increased functionality to act as a proxy device for other consumer electronic media devices. As such, the proxy device is able to provide a wide variety of advantageous proxy services for other consumer electronic media devices.

For instance, the proxy device can act as a translator between two devices having incompatible protocols thereby enabling them to communicate together. Additionally, the proxy device can enable Home Audio Video Interoperability (HAVi) devices to have greater control over non-HAVi devices. The proxy device can extend the existing functionality of devices as well as provide new functionality for them. Furthermore, the proxy device can act as a command arbitrator for particular devices.

Also, the proxy device can act as a proxy for all or a portion of the functionality of a device. It should be appreciated that these are only an example of the possible advantageous proxy services that the proxy device can provide for other devices, in accordance with the present invention. In this manner, the present invention enables a network of consumer electronic media devices to operate in conjunction and also to provide additional functions which are useful and/or desirable to the user.

More specifically, in a network of consumer electronic media devices, a method of communicating between a plurality of consumer electronic media devices, the method comprising the steps of: a) establishing a first consumer electronic media device as a proxy device for a second consumer electronic media device within the network of consumer electronic media devices, wherein the plurality of consumer electronic media devices are coupled together as a network by a common bus, wherein step a) comprises the step of storing a data structure in memory of the first consumer electronic media device, wherein the data structure defines proxy services that the first consumer electronic media device performs for the second consumer electronic media device; b) transmitting a signal to the first consumer electronic media device indicating a particular proxy service to be performed; c) the first consumer electronic media device receiving the signal; and d) in response to receiving the signal, the first consumer electronic media device performing the particular proxy service for the second consumer electronic media device.

Embodiments include the above and further comprising the step of e) the first consumer electronic media device transmitting resultant information to the second consumer electronic media device, the resultant information identified in the signal. Furthermore, embodiments include the method described above wherein the step a) comprises the steps of: a1) the first consumer electronic media device discovering the second consumer electronic media device coupled to the common bus; a2) the first consumer electronic media device determining a functionality of the second consumer electronic media device; a3) the first consumer electronic media device determining whether the first consumer electronic media device can provide a proxy service to the second consumer electronic media device; and a4) if the first consumer electronic media device can provide a proxy service to the second consumer electronic media device, the first consumer electronic media device performing the step of storing the data structure in memory of the first consumer electronic media device.

Moreover, embodiments include the method described above wherein the step a) comprises the steps of: a1) a third consumer electronic media device examining the memory of the first consumer electronic media device to determine that the first consumer electronic media device is the proxy device for the second consumer electronic media device; and a2) the third consumer electronic media device recording this information within its memory.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
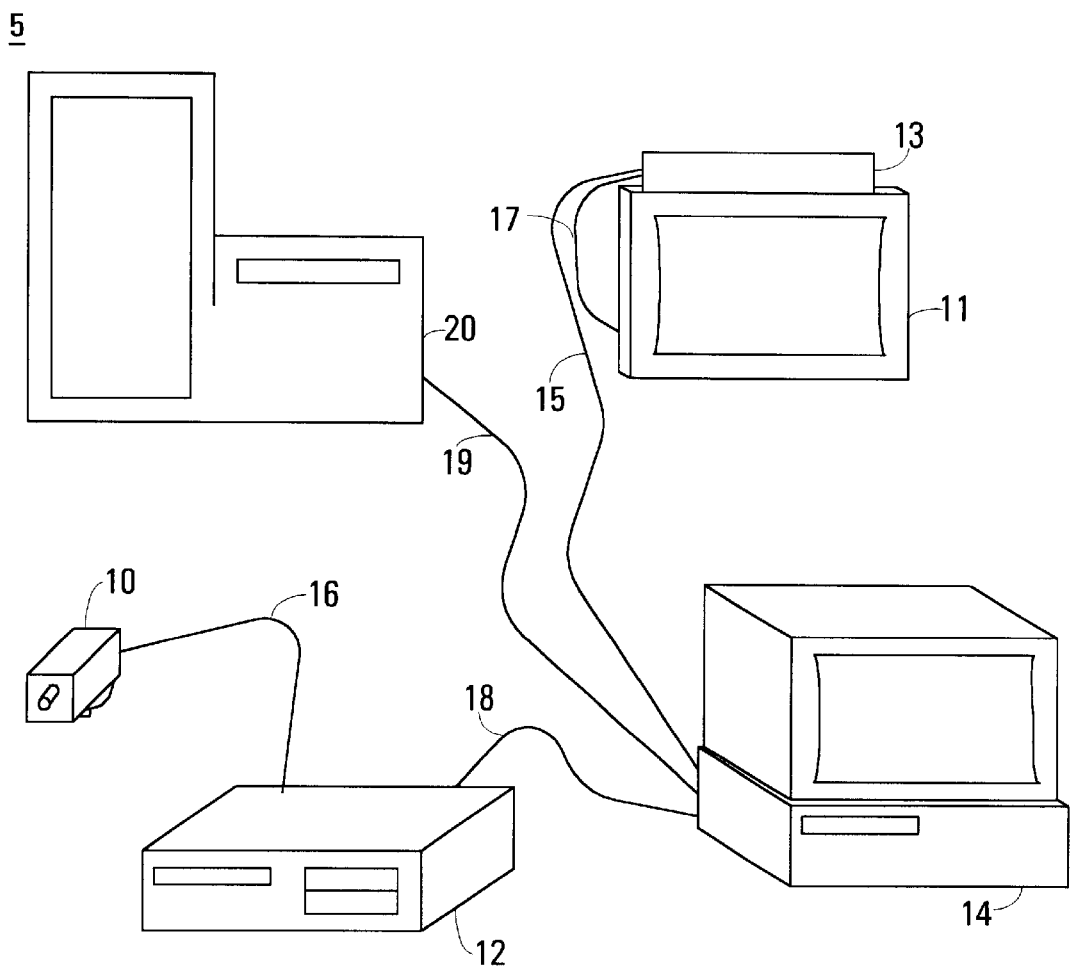
FIG. 1 illustrates an exemplary networked system of consumer electronic media devices ("nodes") including a video camera, a video cassette recorder, a computer system, a set-top-box, a television, and a compact disc player.

In the following detailed description of the present invention, a method and system for defining and discovering proxy functionality on a distributed audio video network, numerous specific details are set forth in order to provide a thorough understanding of the present invention. However, it will be recognized by one of ordinary skill in the art that the present invention may be practiced without these specific details or with equivalent thereof. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a consumer electronic media device. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a consumer electronic media device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "processing" or "computing" or "generating" or "calculating" or "determining" or "displaying" or the like, refer to the action and processes of a consumer electronic media device, or similar electronic computing device, that manipulates and transforms data. The data is represented as physical (electronic) quantities within the consumer electronic media device's registers and memories and is transformed into other data similarly represented as physical quantities within the consumer electronic media device memories or registers or other such information storage, transmission, or display screens.

The present invention includes a method and system for defining and discovering proxy functionality on a distributed audio video network. The present invention operates within a network of consumer electronic media devices, e.g., television (TV), set-top-box, digital video disc (DVD) player, video cassette recorder (VCR), compact disc (CD) device, personal computer system (PC), video camera, etc., that are coupled together using the IEEE 1394 serial communication standard. Specifically, the present invention enables a consumer electronic media device having increased functionality to act as a proxy device for other consumer electronic media devices. As such, the proxy device is able to provide a wide variety of advantageous proxy services for other consumer electronic media devices. For instance, the proxy device can act as a translator between two devices thereby enabling them to communicate. Additionally, the proxy device can enable Home Audio Video Interoperability (HAVi) devices to have greater control over non-HAVi devices. Moreover, the proxy device can extend the existing functionality of devices as well as provide new functionality for them. Furthermore, the proxy device can act as an arbitrator for particular devices. Also, the proxy device can act as a proxy for all or a portion of the functionality of a device. It should be appreciated that these are only a few of the advantageous proxy services that the proxy device can provide for other devices, in accordance with the present invention. In this manner, the present invention enables a network of consumer electronic media devices to operate in conjunction and also to provide additional functions which are useful and/or desirable to its user.

FIG. 1 illustrates an exemplary network system 5 that can support the embodiments of the proxy functionality in accordance with the present invention. Exemplary system 5 includes consumer electronic media devices (including computer systems) as nodes but could be extended equally well to cover other electronic devices. System 5 includes a video camera 10, a video cassette recorder (VCR) 12, a computer system 14, a set-top-box 13, a television set (TV) 11, and a compact disc (CD) player 20 connected together with the network by IEEE 1394–1995 (IEEE 1394) cables 15, 16, 17, 18, and 19. The set-top-box 13 can be coupled to receive media from a cable TV system. The IEEE 1394 cable 16 couples the video camera 10 to the VCR 12 allowing the video camera 10 to send data, commands and parameters to the VCR 12 for recording (or to any other-device of network 5). The IEEE 1394 cable 18 couples the VCR 12 to the computer system 14 allowing the VCR 12 to send data, commands and parameters to the computer system 14 for display (or to any other device of network 5).

The IEEE 1394 cable 15 couples the set-top-box 13 to the computer system 14. The set-top-box 13 is also coupled to the TV 11 by the cable 17. The CD player 20 is coupled to the computer system 14 by the IEEE 1394 cable 19. The configuration 5 illustrated in FIG. 1 is exemplary only and it should be apparent that an audio/video network in accordance with the present invention could include many different combinations of components. The devices within an IEEE 1394 network 5 are autonomous devices, meaning that in an IEEE 1394 network, in which a computer is one of the devices, there is no true master-slave relationship between the computer system 14 and the other devices. In fact, as described below in an exemplary embodiment of the proxy functionality of the present invention, the proxy is the set-top-box 13. In many IEEE 1394 network configurations, a computer system 14 may not be present. Even in such configurations, the devices within the network are fully capable of interacting with each other on a peer-to-peer basis. It should be recognized that data, commands and parameters can be sent between all of the devices within the IEEE 1394 network 5.

The IEEE 1394 serial bus used by system 5 of FIG. 1 is a high-speed bus architecture for interconnecting digital devices thereby providing a universal input/output connection. The IEEE 1394 standard defines a digital interface for the applications thereby eliminating the need for an application to covert digital data to analog data before it is transmitted across the bus. Correspondingly, a receiving application receives digital data from the bus, not analog data, and therefore is not required to covert analog data to digital data. The cable required by the IEEE 1394 standard is very thin in size compared to other bulkier cables used to connect such devices. Devices can be added and removed from an IEEE 1394 bus while the bus is active. If a device is so added or removed, the bus automatically reconfigures itself for transmitting data between the then existing nodes. A node is considered a logical entity having a unique address on the bus structure. It is appreciated that each node provides an identification ROM, a standardized set of control registers and its own address space.

The IEEE 1394 communication standard within system 5 of FIG. 1 supports isochronous data transfers of digital encoded information. Isochronous data transfers are real-time transfers which take place such that the time intervals between significant instances have the same duration at both the transmitting and receiving applications. Each packet of data transferred isochronously is transferred in its own time period. An example of an application for the transfer of data isochronously is from VCR 12 to TV 11 of FIG. 1. The VCR 12 records images and sounds and saves the data in discrete packets. The VCR 12 then transfers each packet, representing the images and sounds recorded over a limited time period, during that time period, for display by the TV 11. The IEEE 1394 standard bus architecture provides multiple channels for isochronous data transfers between applications. Specifically, a six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

Proxy services or functionality of the present invention are implemented by a consumer electronic media device that acts as a proxy device for one or more consumer electronic media devices. The proxy device can be any device coupled within an IEEE 1394 network configuration (e.g., system 5 of FIG. 1) which operates under the direction of proxy software in accordance with the present invention. Furthermore, the proxy device typically has increased functionality enabling it to provide a variety of proxy services for other consumer electronic media devices. The functional capabilities of the proxy device defines the type of proxy services that the proxy device can provide to other consumer electronic media devices. In one embodiment of the present invention, the set-top-box 13 is an intelligent device and acts as the proxy device. In other embodiments, the computer system 14 can act as the proxy device.

Figure 2A:
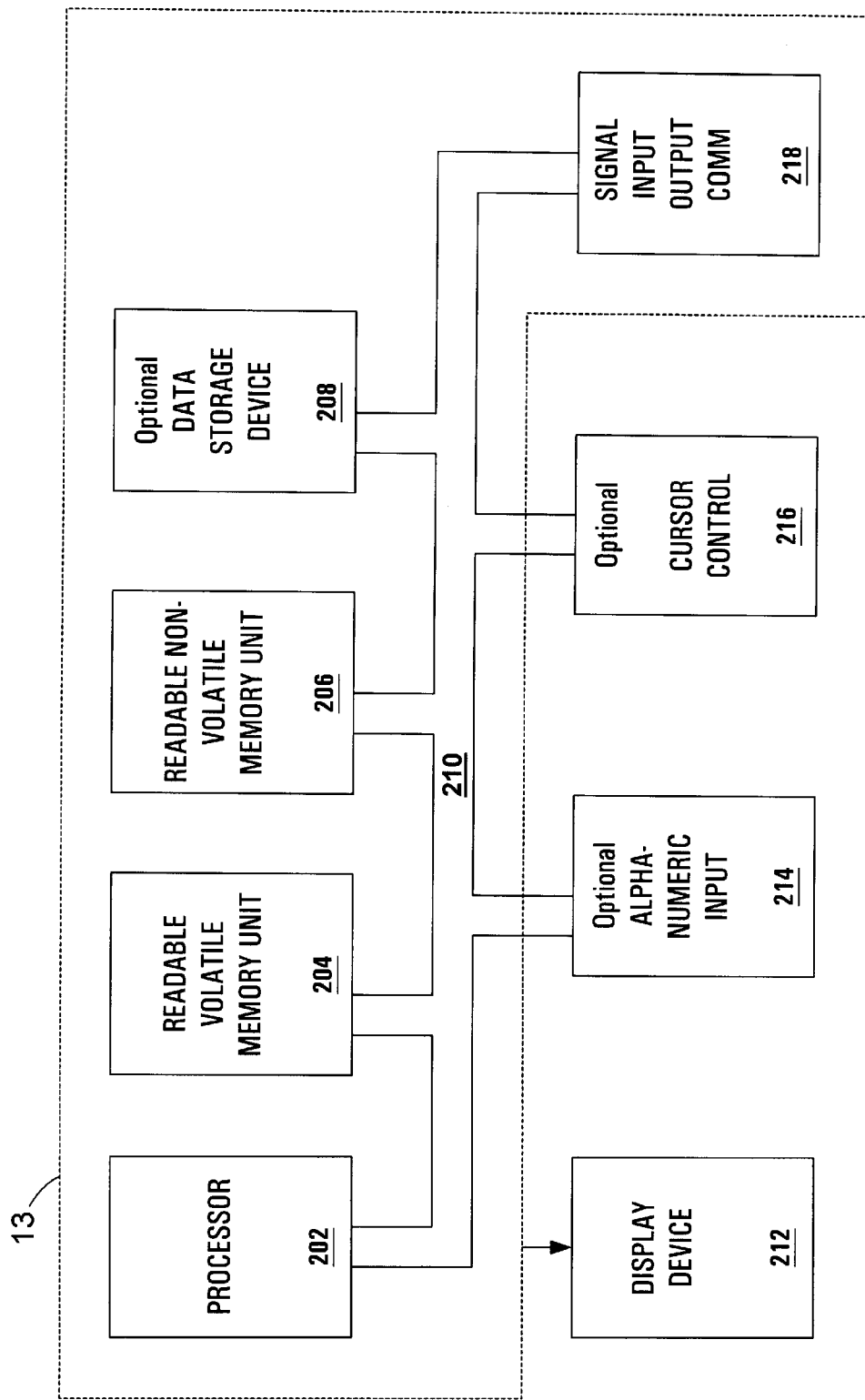
FIG. 2A is a block diagram illustrating components of a proxy device in accordance with the present invention.

FIG. 2A is a block diagram illustrating components of a proxy device in accordance with the present invention, and in this example it is the set-top-box 13 of FIG. 1. It should be appreciated that other consumer electronic media devices can also be proxy devices in accordance with the present invention. Set-top-box 13 includes an address/data bus 210 for communicating information, a central processor 202 coupled with the bus 210 for processing information and instructions, a readable volatile memory 204, e.g., random access memory (RAM), static RAM, dynamic RAM, etc., coupled with the bus 210 for storing information and instructions for the central processor 202 and a readable non-volatile memory 206, e.g., read only memory (ROM), programmable ROM, flash memory, EPROM, EEPROM, etc., coupled with the bus 210 for storing static information and instructions for the processor 202. Set-top-box 13 can also optionally include a data storage device 208 ("disk subsystem") such as a magnetic or optical disk and disk drive coupled with the bus 210 for storing information and instructions. In one embodiment, a display device 212 can be part of the proxy device. As shown in FIG. 2A, the display device (e.g., TV 11) is external to the set-top-box 13. When incorporated into the proxy device, the display device 212 can be a display screen (e.g., flat panel or cathode ray tube, etc.) or it can be a liquid crystal display (LCD) panel or other suitable display device for the display of alphanumeric characters and/or graphic images.

The proxy device 13 of FIG. 2A also interfaces with or includes one or more user input devices. In one embodiment, the input device can be an alphanumeric input device 214 including alphanumeric and function keys coupled to the bus 210 for communicating information and command selections to the central processor 202. Alternatively, or in addition, the proxy device 13 can interface with or include a cursor control or cursor directing device 216 coupled to the bus 210 for communicating user input information and command selections to the central processor 202. The cursor directing device 216 can be implemented using a number of well known devices such as a mouse, a track ball, a track pad, an electronic pad and stylus, an optical tracking device, a touch screen, etc. In addition, the user input device can also be a remote control device, e.g., a universal remote control device having a number of buttons, dials, etc., with an infra-red signal communication capability. Set-top-box 13 can also include a signal generating device 218 coupled to the bus 210 for interfacing with other networked devices over the IEEE 1394 bus.

The proxy device acts as a proxy on behalf of another consumer electronic media device. This particular consumer electronic media device can also include one or more components as described with respect to FIG. 2A. Particularly, the target device in accordance with the present invention includes readable memory units which can include one or more ROM and/or RAM units for storing its node identification (ID), functional capabilities, protocol, and the like, which are described below.

Figure 2B:
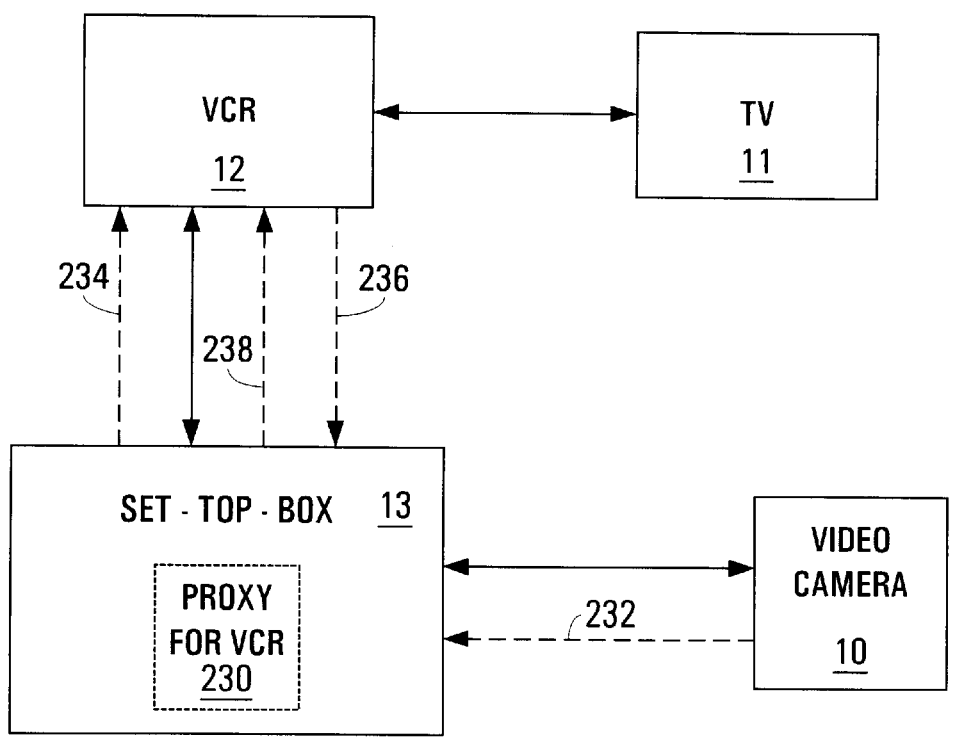
FIG. 2B is a block diagram illustrating an overview of the manner in which a first consumer electronic media device functions as a proxy device for a second consumer electronic media device in accordance with the present invention.

FIG. 2B is a block diagram illustrating an overview of the manner in which a first consumer electronic media device (e.g., set-top-box 13) functions as a proxy device for a second consumer electronic media device (e.g., VCR 12) in accordance with the present invention. Specifically, the set-top-box 13 is established as a proxy device for the VCR 12 within a network of consumer electronic media devices (e.g., video camera 10 and TV 11) coupled together by a common bus (e.g., the IEEE 1394 serial communication bus). The set-top-box 13 can be established as the proxy device for the VCR 12 by establishing a stored data structure 230 within the configuration ROM of a memory unit of the set-top-box 13. The data structure 230 defines proxy services that the set-top-box 13 can perform for the VCR 12.

As a proxy device for the VCR 12 of FIG. 2B, the set-top-box 13 is responsible for performing particular proxy services for the VCR 12. One such proxy service can be operating as a command arbitrator to the VCR 12. In this instance, the video camera 10 communicates to the set-top-box 13 in order to properly command the VCR 12. For example, the video camera 10 transmits a command signal 232 to the set-top-box 13. In response to receiving command signal 232, the set-top-box 13 transmits a command signal 234 to the VCR 12. Another such proxy service that can be performed by the set-top-box 13 is to operate as a data library for the VCR 12. For instance, the VCR 12 transmits a signal 236 to the set-top-box 13 requesting particular data (e.g., an icon). In response to receiving signal 236, the set-top-box 13 transmits a signal 238 containing the requested data to the VCR 12. Therefore, the set-top-box 13 is capable of receiving signals from the VCR 12 or any other consumer electronic media devices (e.g., TV 11 and PC 14) within the network and then performing the requested proxy service for VCR 12.

Figure 2C:
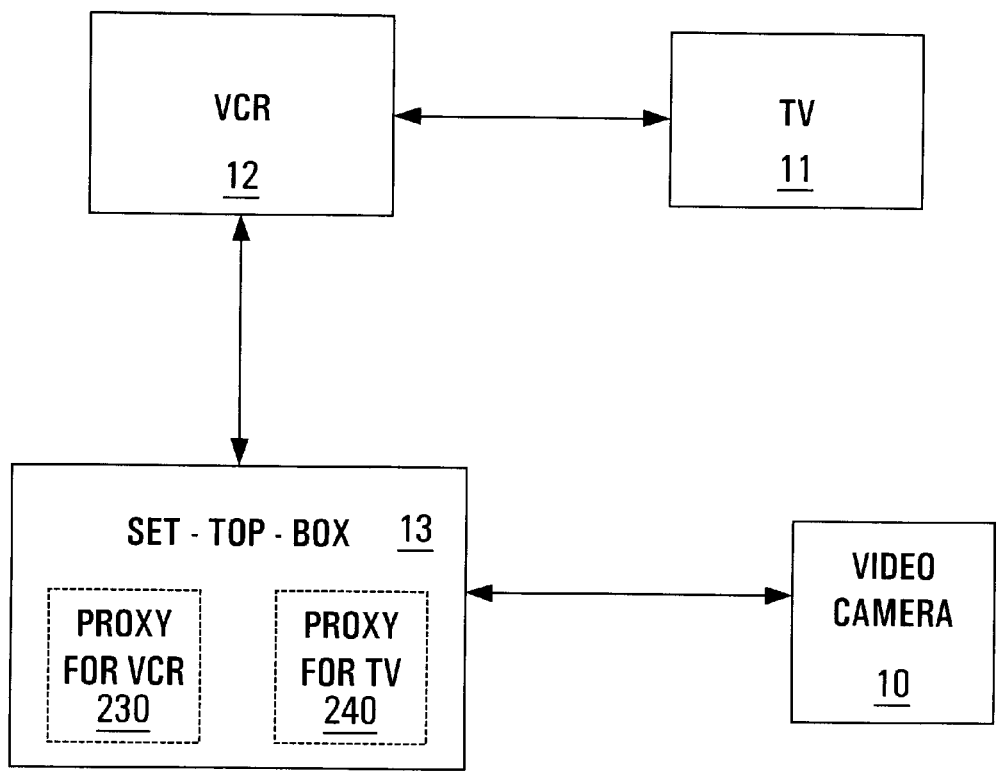
FIG. 2C is a block diagram illustrating a first consumer electronic media device acting as a proxy device for two other consumer electronic media devices of a network in accordance with the present invention.

FIG. 2C is a block diagram illustrating a first consumer electronic media device (e.g., set-top-box 13) acting as a proxy device for two other consumer electronic media devices (e.g., TV 11 and VCR 12) of a network in accordance with the present invention. Specifically, the set-top-box 13 operates in the same manner as described above with reference to FIG. 2B, except it is a proxy for both the VCR 12 and the TV 11. The set-top-box 13 can be established as the proxy device for the VCR 12 and the TV 11 by establishing stored data structures 230 and 240 within the configuration ROM of a memory unit of the set-top-box 13. The data structures 230 and 240 define proxy services that the set-top-box 13 can perform for the. VCR 12 and the TV 11, respectively. It should be appreciated that the proxy device in accordance with the present invention is capable of acting as a proxy for a plurality of consumer electronic media devices which are coupled together as a network by a common bus (e.g., the IEEE 1394 serial communication bus).

Figure 2D:
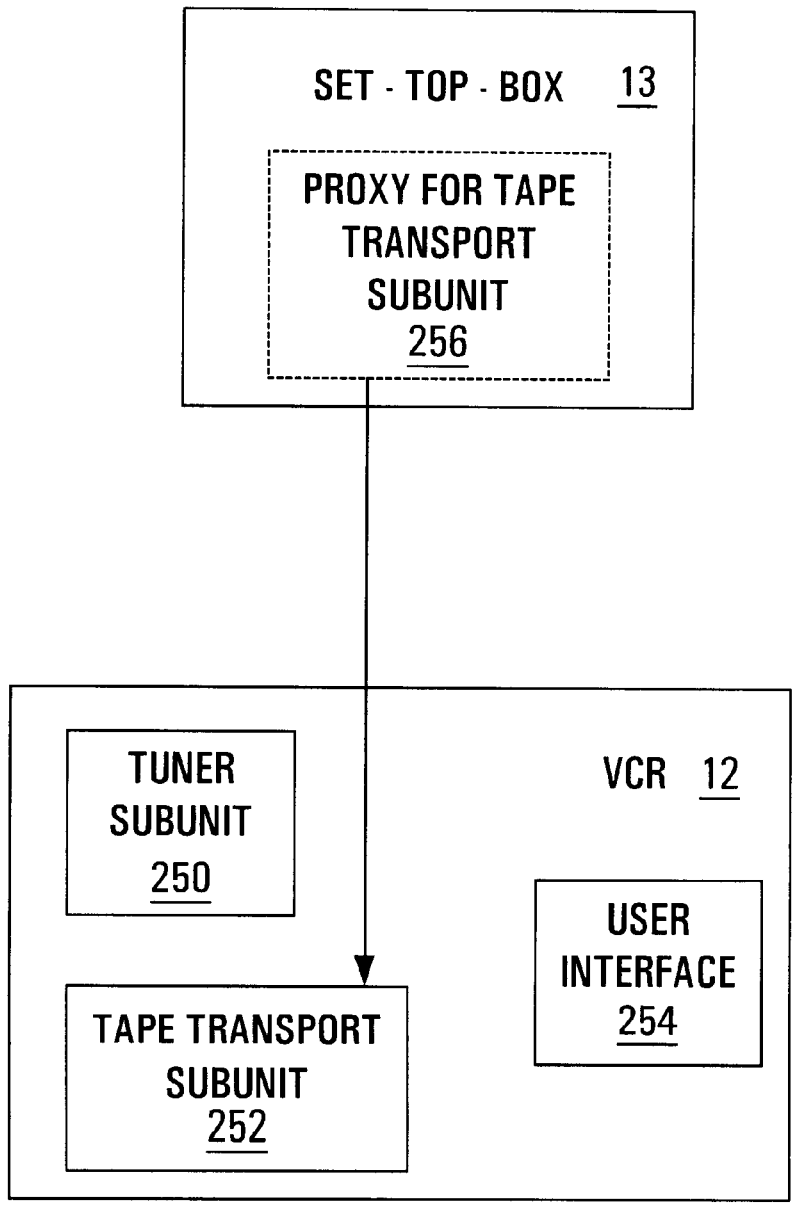
FIG. 2D is a block diagram illustrating a first consumer electronic media device being a proxy device for a particular subunit of another consumer electronic media device in accordance with the present invention.

FIG. 2D is a block diagram illustrating a first consumer electronic media device (e.g., set-top-box 13) being a proxy device for a particular subunit, e.g., Audio Video Control (AV/C), of another consumer electronic media device (e.g., VCR 12) in accordance with the present invention. Typically, within a consumer electronic media device which conforms to a particular protocol (e.g., AV/C) there are several different subunits, groupings of functionality, that can be individually addressed and controlled by another consumer electronic media device of network 5. For instance, a VCR device 12 can have three subunits, one subunit 252 for the actual VCR tape transport mechanism, another subunit 250 for the tuning functionality, and another subunit 254 for providing the user interface functionality. The set-top-box 13 is established as a proxy device for the tape transport subunit 252 of the VCR 12. The set-top-box 13 can be established as the proxy device for the tape transport subunit 252 of the VCR 12 by establishing a stored data structure 256 within the configuration ROM of a memory unit of the set-top-box 13. The data structure 256 defines proxy services that the set-top-box 13 can perform for the tape transport subunit 252 of the VCR 12. It should be appreciated that the proxy device of the present invention is capable of acting as a proxy for a plurality of subunits located within a single consumer electronic media device which is part of a network coupled together by a common bus (e.g., the IEEE 1394 serial communication bus). It should be further appreciated that the proxy device of the present invention is also capable of acting as a proxy for a plurality of subunits located within a plurality of consumer electronic media devices coupled together as a network by a common bus.

Figure 3A:
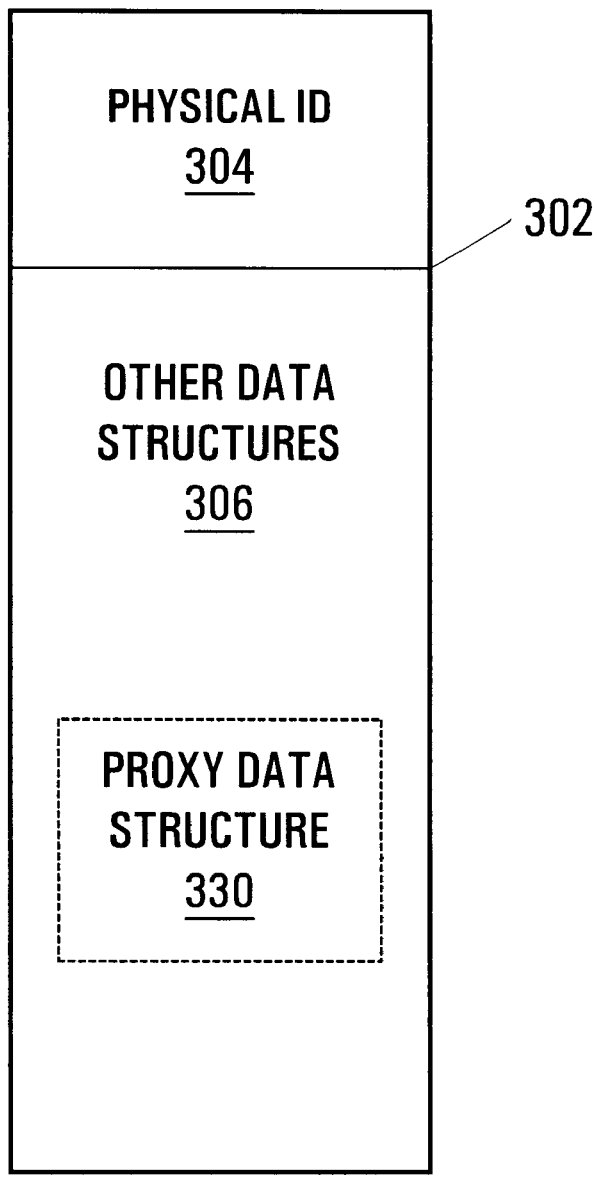
FIG. 3A is a block diagram of memory space referred to as a configuration ROM, which is located within each node of the network of FIG. 1.

FIG. 3A is a block diagram of memory space referred to as a configuration ROM 302, which is located within each node (e.g., TV 11, VCR 12, set-top-box 13, etc.) of network 5 of FIG. 1. It should be appreciated that configuration ROM 302 of the present invention is defined by the IEEE 1212 specification, which is well known by those of ordinary skill in the art and is the foundation technology of the IEEE 1394 serial bus specification. One embodiment of configuration ROM 302 is a 64 bit memory space that is divided into two different subsections. One subsection contains the upper 16 bits of address space that are used for storing the identification (ID) of a node, which includes its physical identification (phyID) 304. The other subsection within configuration ROM 302 contains the remaining 48 bits of address space that are used for storing other configuration ROM data structures 306 pertaining to the specific node, e.g., its Global Unique Identification (GUID) value. In this manner, an IEEE 1394 serial bus network of the present invention is a memory mapped bus network. It should be appreciated that a proxy data structure 330 is typically stored within the 48 bits of address space along with the other data structures 306 of configuration ROM 302, in accordance with the present invention. The proxy data structure 330 is described in more detail below with reference to FIGS. 3C and 3D. It should be further appreciated that there are many other embodiments of the configuration ROM 302 in accordance with the present invention. For example, the configuration ROM 302 can be implemented using RAM, static RAM, dynamic RAM, programmable ROM, flash memory, EPROM, EEPROM, or any other memory device.

Figure 3B:
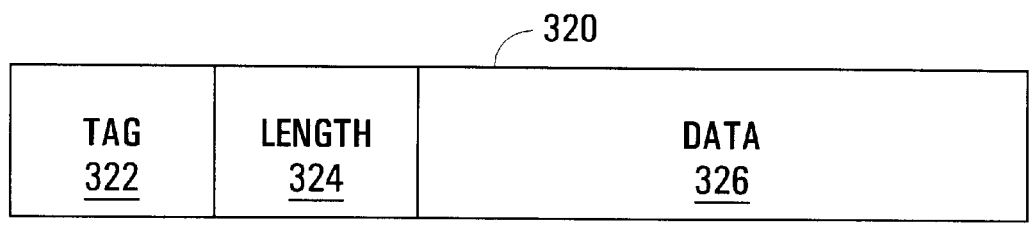
FIG. 3B is a block diagram representing a format in which information is stored within the configuration ROM of FIG. 3A in accordance with one embodiment of the present invention.

FIG. 3B is a block diagram representing a format in which information is stored within the configuration ROM 302 of FIG. 3A in accordance with one embodiment of the present invention. Specifically, a data structure 320, as defined within the IEEE 1212 specification, is typically used to store individual pieces of information throughout the memory space of configuration ROM 302. Furthermore, data structure 320 allows a consumer electronic media device (e.g., CD player 20) of network 5 to search the configuration ROM 302 of another consumer electronic media device (e.g., VCR 12) for its contents. Each data structure 320 is typically comprised of a tag 322, a length 324, and data 326. The tag 322 identifies the corresponding data 326, while the length 324 indicates the amount of bytes that correspond to data 326. By utilizing a uniform format of storing information within the configuration ROM 302 of all the nodes of network 5, each node is able to derive specific information from all the other nodes of network 5.

Figure 3C:
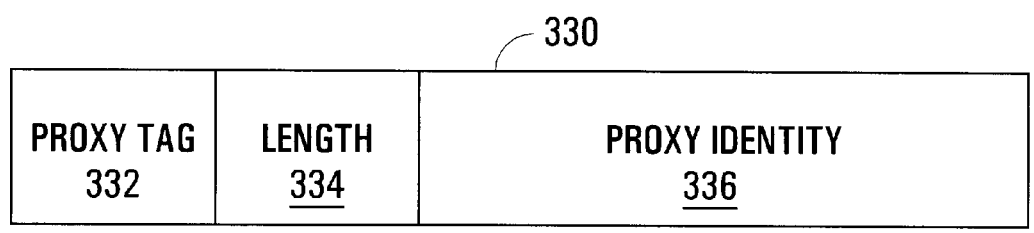
FIG. 3C is a block diagram representing a format for a proxy device to identify itself as a proxy to all other devices of the network of FIG. 1 in accordance with one embodiment of the present invention

FIG. 3C is a block diagram representing a format for a proxy device (e.g., set-top-box 13 of FIG. 2A) to identify itself as a proxy to all other consumer electronic media devices of network 5 in accordance with one embodiment of the present invention. Specifically, the proxy device 13 stores specific information within its configuration ROM 302 utilizing a proxy data structure 330, which is similar to data structure 320 of FIG. 3B. Each proxy data structure 330 stored within the configuration ROM 302 of proxy device 13 includes a proxy tag 332, a length 334, and a proxy identifier 336.

The proxy tag 332 of FIG. 3C, in accordance with the present invention, is a recognizable tag to other nodes of network 5 indicating that proxy device 13 is a proxy for a particular node (e.g., VCR 12). It should be appreciated that proxy tag 332 should be defined within the IEEE 1212r specification, in accordance with the present invention. In this manner, all other consumer electronic devices that are coupled together by an IEEE 1394 serial bus will, by definition, recognize proxy tag 332 when they search the configuration ROM of proxy device 13, regardless of whatever higher level protocols (e.g., AV/C, HAVi, etc.) they support. The length 334 indicates the amount of bytes that correspond to the proxy identifier 336.

The proxy identifier 336 of FIG. 3C contains data indicating the specific identity of the node within network 5 for which proxy device 13 is acting as a proxy. One method of identifying the specific node in accordance within the present invention is to utilize the phyID of the node along with other IEEE 1212r data structure information. Another method of identifying the specific node in accordance within the present invention is to utilize the GUID of the node along with the node's functionality information. It should be appreciated that other information can be stored within proxy identifier 336. For instance, the proxy identifier 336 can also include data indicating a particular proxy service or services (e.g., data library, translator, arbitrator, etc.) that proxy device 13 provides for another node (e.g., VCR 12). Furthermore, the proxy identifier 336 can also include data indicating that proxy device 13 is a proxy for a particular (e.g., AV/C) subunit or subunits of another node. Moreover, the proxy identifier 336 can also include data indicating that proxy device 13 is a proxy for a particular (e.g., IEEE 1212) unit directory of another node.

Therefore, by reading the configuration ROM 302 of proxy device 13, the other nodes (devices) of network 5 within the present embodiment are able to determine that proxy device 13 is acting as a proxy for another node (e.g., VCR 12), the proxy services that the proxy device 13 provides on behalf of that node, and the particular protocol of those proxy services.

Figure 3D:
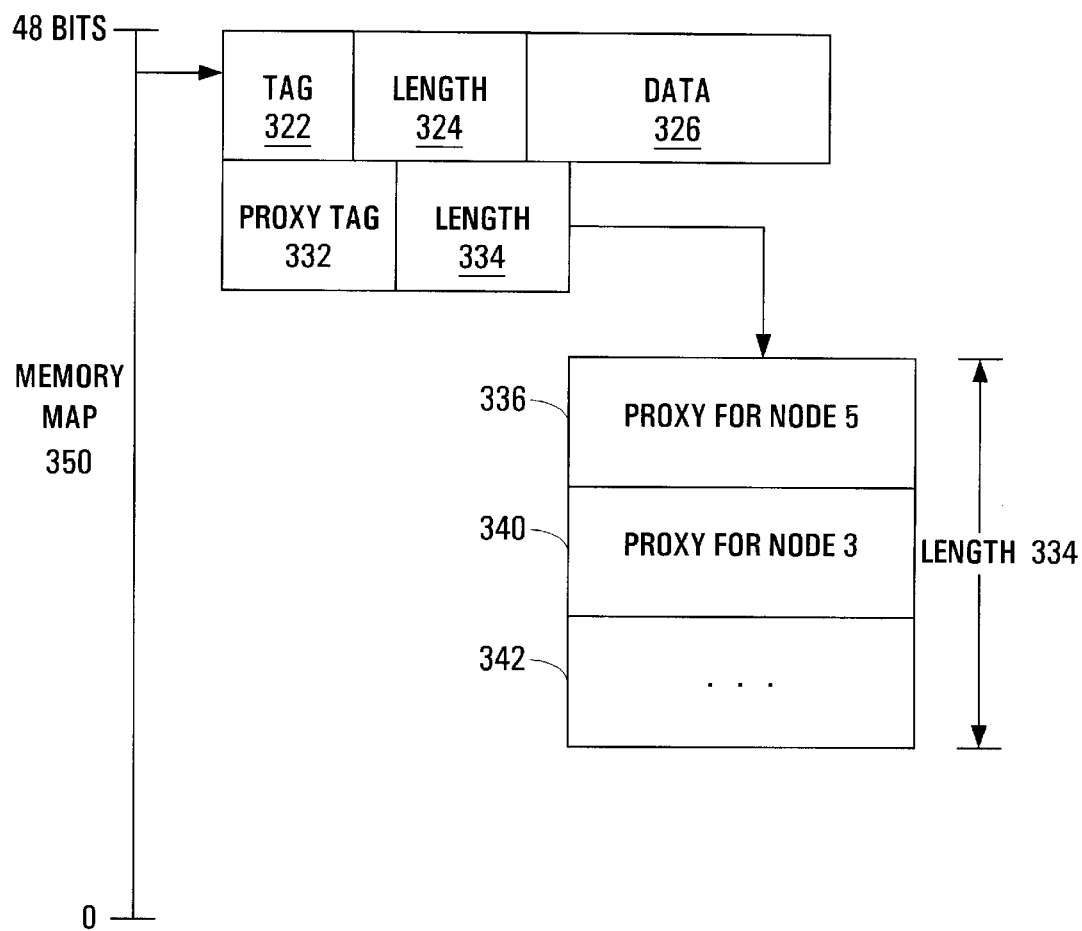
FIG. 3D is a block diagram illustrating a consumer electronic media device searching the configuration ROM of another consumer electronic media device in order to determine if it is a proxy device in accordance with one embodiment of the present invention.

FIG. 3D is a block diagram illustrating a consumer electronic media device searching the configuration ROM of another consumer electronic media device in order to determine if it is a proxy device in accordance with the present invention. Specifically, within one embodiment of the present invention, a consumer electronic media device (e.g., PC 14) searches the configuration ROM of another consumer electronic media device (e.g., set-top-box 13) utilizing well known IEEE 1212 communication protocol mechanisms (e.g., IEEE 1212 ROM protocol) in order to determine if it is a proxy device. For instance, the PC 14 begins its search of a memory map 350 of the configuration ROM of the set-top-box 13 at a particular starting address, typically referred to as the root. The PC 14 reads tag 322 which identifies the corresponding data 326. Since the PC 14 is searching the memory map 350 for a proxy tag (e.g., 332), it reads the length 324 in order to skip data 326 and reach the next tag within the memory map 350, which happens to be proxy tag 332. It should be appreciated that if the next tag was not proxy tag 332, the PC 14 would continue its search of the memory map 350 by repeating the process described above for skipping data until the proxy tag 332 is found. Furthermore, if a proxy tag was not stored within memory map 350, the PC 14 would begin searching the configuration ROM of another consumer electronic media device that it has not searched, if there is one available within network 5.

Upon reaching the proxy tag 332 stored within the memory map 350 of FIG. 3D, the PC 14 then reads it. The proxy tag 332 indicates that the set-top-box 13 is a proxy device for one or more consumer electronic media devices of network 5. The PC 14 then reads length 334 which indicates the amount of bytes that correspond to the proxy identifiers 336, 340, and 342. The PC 14 subsequently reads the proxy identifiers 336, 340, and 342 in order to determine the specific identities of the nodes within network 5 for which set-top-box 13 is acting as a proxy device. The PC 14 then stores this information within its memory to be utilized in accordance with the present invention.

In the present invention, there is another method for enabling a proxy device (e.g., set-top-box 13 of FIG. 2A) to identify itself as a proxy to all other consumer electronic media devices of network 5. Specifically, proxy device 13 can represent itself as a proxy for another node of network 5 within an IEEE 1212 Unit Directory structure, which is stored within one of its memory units. It should be appreciated that the IEEE 1212 Unit Directory structure is well known by those of ordinary skill in the art. Within one embodiment of the IEEE 1212 Unit Directory structure, in accordance with the present invention, is stored information indicating the identity of the node within network 5 for which proxy device 13 is acting as a proxy, the proxy services or capabilities it provides on behalf of that node, and the protocol of the particular proxy services. It should be further appreciated that the identity of the node can be specified using any of the methods described above or by using the GUID of the node along with a unique identifier of the unit directory within that node. The identifying reference of the node is stored within the unit directory of proxy device 13.

Figure 4A:
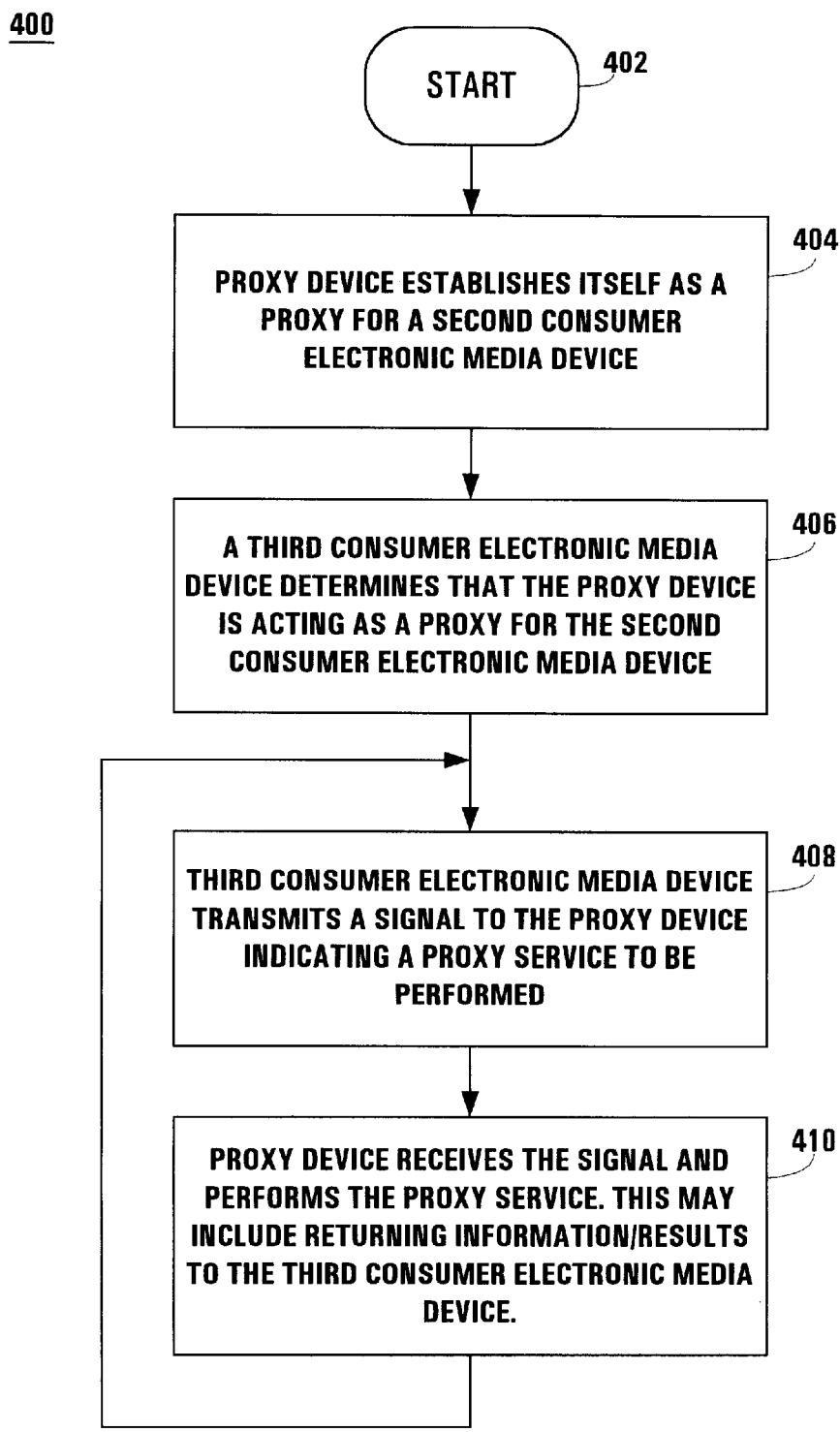
FIG. 4A is a flowchart illustrating one embodiment of steps implemented in accordance with the proxy functionality of the present invention.

FIG. 4A is a flowchart illustrating steps of a process 400 implemented in accordance with one embodiment of the proxy functionality of the present invention.

Process 400 is realized as program code stored within computer readable memory units of a proxy consumer electronic media device and a second consumer electronic media device of network 5. Process 400 begins at step 402 and at step 404, the proxy device (e.g., set-top-box 13) establishes itself as a proxy for a second consumer electronic media device (e.g., VCR 12). One embodiment of step 404, in accordance with the present invention, is described below with reference to FIG. 5. At step 406, a third consumer electronic media device (e.g., PC 14) determines that the proxy device is acting as a proxy for the second consumer electronic media device. It should be appreciated that the third consumer electronic media device understands the functionality of the proxy device in accordance with the present invention. One embodiment of step 406 in accordance with the present invention can be performed by the third consumer electronic media device reading the configuration ROM located within the proxy device. Another embodiment of step 406 in accordance with the present invention can be performed by the third consumer electronic media device utilizing an IEEE 1212 Unit Directory structure which is stored within the proxy device.

At step 408, the third consumer electronic media device transmits a signal to the proxy device indicating a particular proxy service to be performed by the proxy device. At step 410, the proxy device receives the signal from the third consumer electronic media device and performs the requested proxy service, which may include returning information/results to the third consumer electronic media device. At step 410, some of the proxy services which can be performed by the proxy device include providing a data library, being a translator, being an arbitrator, providing additional functionality to the second consumer electronic media device, and extending existing functionality of the second consumer electronic media device. It should be appreciated that the proxy services which the proxy device can perform in accordance with the present invention are not limited to the proxy services listed above. As such, the proxy device can perform many other proxy services, in accordance with the present invention, which have not been mentioned. After the completion of step 410, process 400 returns to step 408.

Figure 4B:
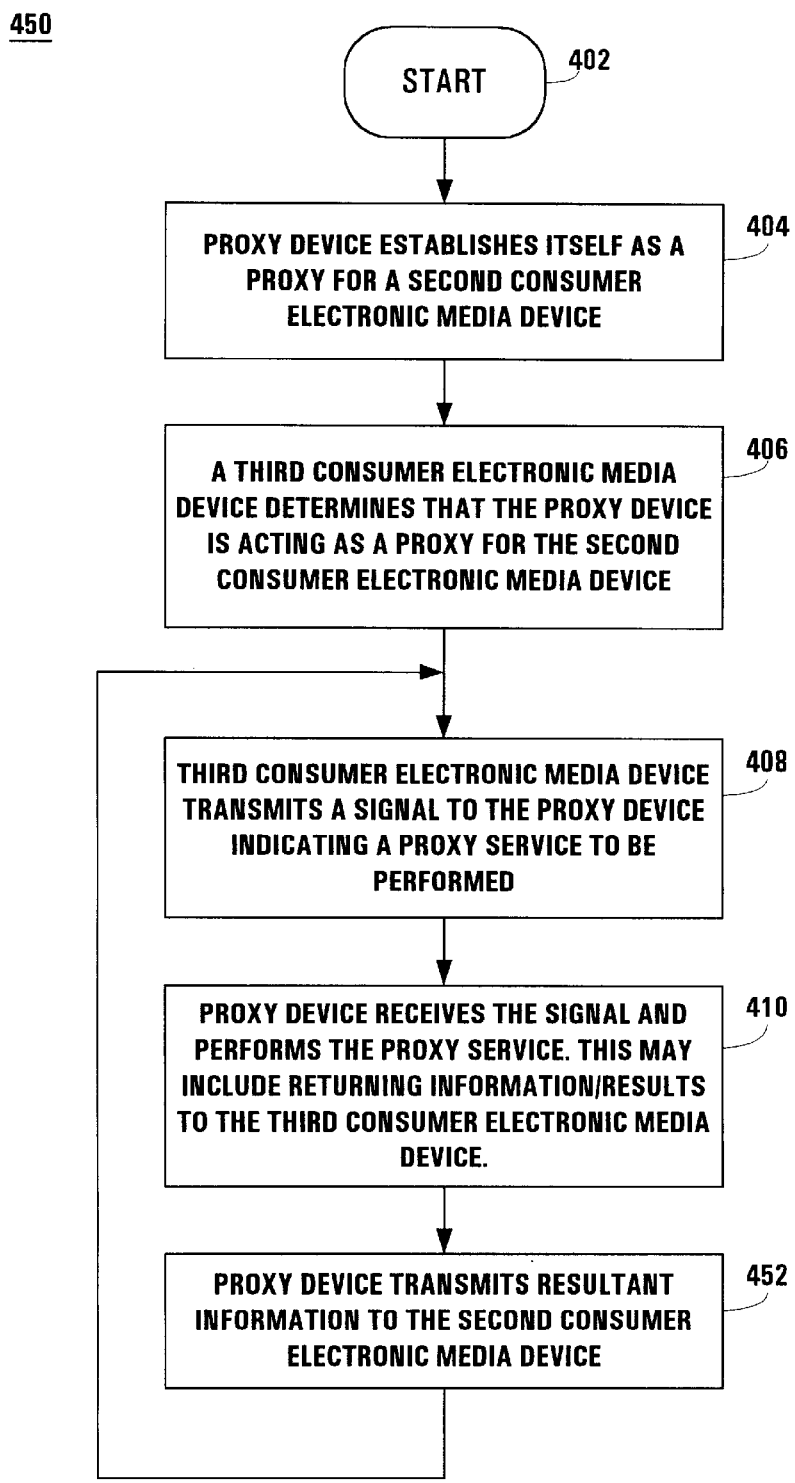
FIG. 4B is a flowchart illustrating another embodiment of steps implemented in accordance with the proxy functionality of the present invention.

FIG. 4B is a flowchart illustrating steps of a process 450 implemented in accordance with the proxy functionality of the present invention. Process 450 is realized as program code stored within computer readable memory units of a proxy consumer electronic media device and a second consumer electronic media device of network 5. Process 450 is similar to process 400 of FIG. 4A, except for the addition of step 452. After the completion of step 410, process 450 proceeds to step 452. At step 452, the proxy device transmits the resultant information of the performed proxy service to the second consumer electronic media device. For instance, after the proxy device translates a received command from one language to another language, the resulting command is then transmitted to the second consumer electronic media device.

Figure 5:
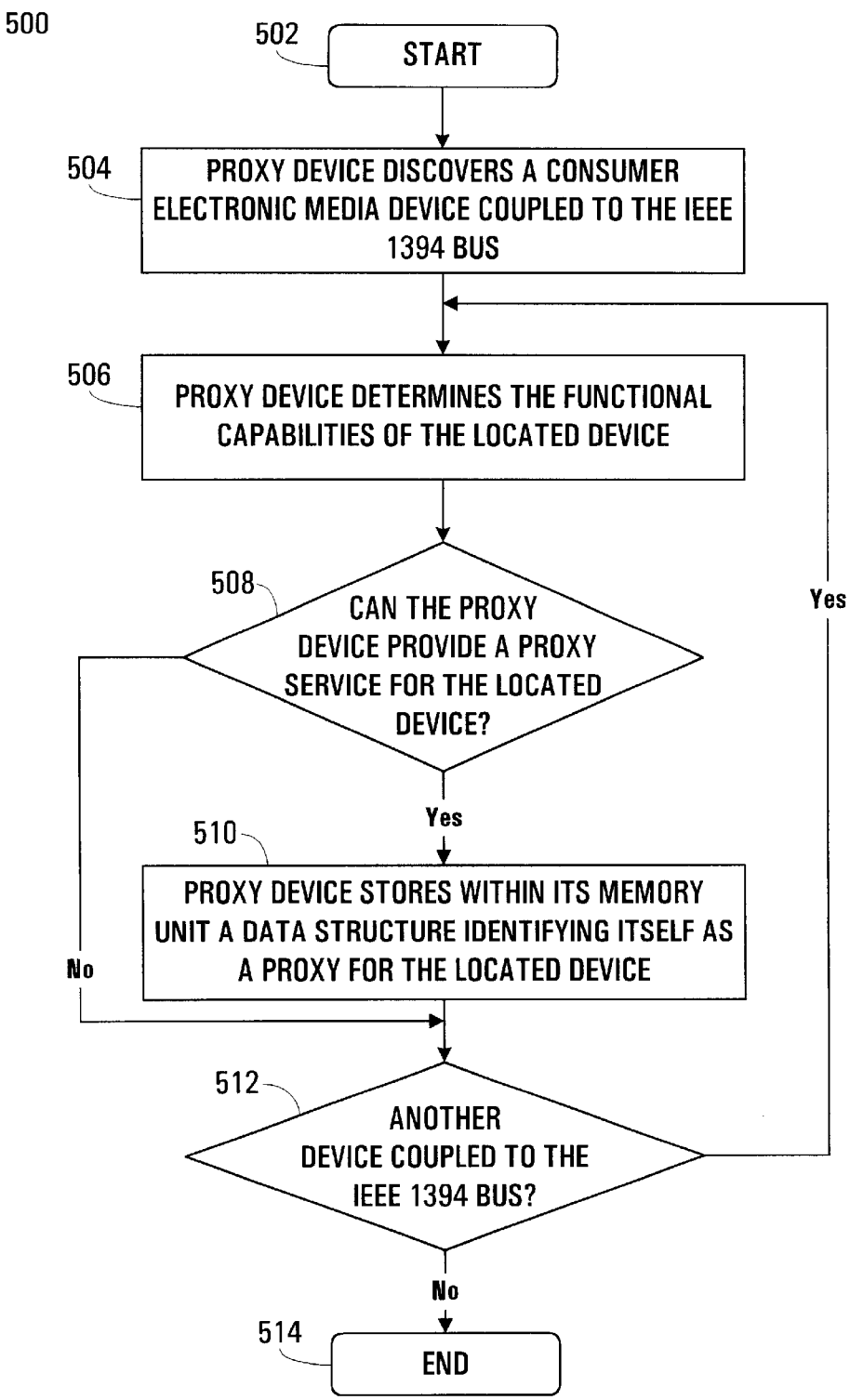
FIG. 5 is a flowchart illustrating steps of a process for establishing a proxy consumer electronic media device as a proxy for other consumer electronic media devices in accordance with one embodiment of the present invention.

FIG. 5 is a flowchart illustrating steps of a process 500 for establishing a proxy consumer electronic media device as a proxy for other consumer electronic media devices in accordance with one embodiment of the present invention. It should be appreciated that process 500 is one embodiment of step 404 of FIGS. 4A and 4B, in accordance with the present invention. Process 500 is realized as program code stored within computer readable memory units of a proxy consumer electronic media device and other consumer electronic media devices of network 5. Process 500 begins at step 502 and at step 504, the proxy device discovers a consumer electronic media device which is coupled to the IEEE 1394 serial bus. This process utilizes well known IEEE 1394 communication protocol mechanisms. At step 506, the proxy device determines the functional capabilities of the located consumer electronic media device. One method in accordance with the present invention for the proxy device to perform step 506 is to read all of the configuration ROM within the located consumer electronic media device, which is a well known IEEE 1212 communication protocol mechanism.

At step 508 of FIG. 5, the proxy device determines whether it can perform a proxy service in behalf of the located consumer electronic media device. One method in accordance with the present invention for the proxy device to perform step 508 is to first compare all its capabilities with the capabilities of the located consumer electronic media device. If any of the relevant capabilities of the proxy device are not performed by the located consumer electronic media device, the proxy device decides to implement them. At step 508, if the proxy device determines that it cannot perform a proxy service in behalf of the located consumer electronic media device, process 500 proceeds to step 512, which is described in detail below. If the proxy device determines at step 508 that it can perform a proxy service in behalf of the located consumer electronic media device, process 500 proceeds to step 510.

At step 510, the proxy device stores a data structure within its memory unit identifying itself as a proxy for the located consumer electronic media device. It should be appreciated that there are different methods in accordance with the present invention for the proxy device to perform step 510. For instance, within one method the proxy device identifies itself as a proxy within its configuration ROM, as described above. Furthermore, within another method the proxy device represents itself as a proxy within an IEEE 1212 Unit Directory structure, as described above.

At step 512 of FIG. 5, the proxy device determines if there is another consumer electronic media device coupled to the IEEE 1394 serial bus. This process utilizes well known IEEE 1394 communication protocol mechanisms. At step 512, if the proxy device detects another consumer electronic media device coupled to the IEEE 1394 serial bus, process 500 returns to step 506. If the proxy device does not detect any other consumer electronic media device coupled to the IEEE 1394 serial bus at step 512, process 500 proceeds to step 514. Process 500 is exited at step 514.

There are several kinds of proxy services in accordance with the present invention which could be provided by a proxy device on behalf of another consumer electronic media device. One proxy service includes the proxy device acting as a translator between two consumer electronic media devices having incompatible protocols thereby enabling them to communicate together. For instance, two consumer electronic media devices which share the same command protocol, e.g., Audio Video Control (AV/C), may not share the same command transport protocol. Currently, Function Control Protocol (FCP) is the only command transport protocol defined to carry AV/C. However, it is quite possible for Serial Bus Protocol 2 (SBP2) to carry AV/C commands as well. A proxy device is able to translate between the two transport protocols allowing the two consumer electronic media devices to operate together. Furthermore, the proxy device can also perform other translation services beyond transport protocol translation. The proxy device can translate from one graphics format to another for user interface data such as device icons, text string formats translations, and the like.

Figure 6:
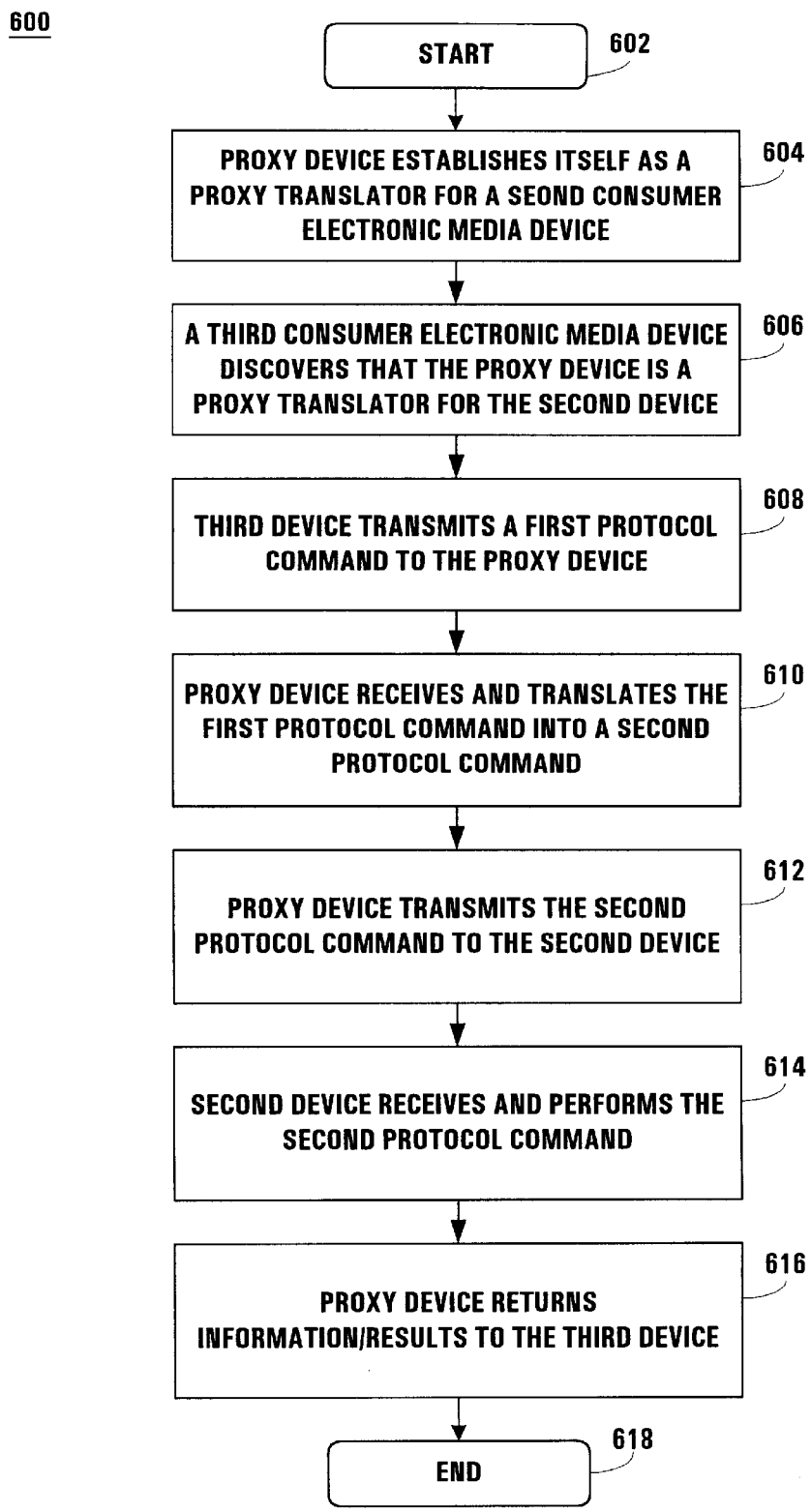
FIG. 6 is a flowchart illustrating steps of a process implemented in accordance with one embodiment of proxy translation functionality of the present invention.

FIG. 6 is a flowchart illustrating steps of a process 600 implemented in accordance with one embodiment of the proxy translation functionality of the present invention. Specifically, process 600 enables a proxy consumer electronic media device to perform translation on communication between two other consumer electronic media devices. Process 600 is realized as program code stored within computer readable memory units of a proxy consumer electronic media device, a second and third consumer electronic media devices of network 5. Process 600 begins at step 602 and at step 604, the proxy device (e.g., set-top-box 13) establishes itself as a proxy translator for a second consumer electronic media device (e.g., VCR 12). It should be appreciated that one method of accomplishing step 604 in accordance with the present invention is to utilize process 500 of FIG. 5. Furthermore, another method of accomplishing step 604 in accordance with the present invention is to utilize any of the methods described above.

At step 606, a third consumer electronic media device (e.g., PC 14) discovers that the proxy device is a proxy translator for the second consumer electronic media device. This process utilizes well known IEEE 1212 communication protocol mechanisms along with methods of the present invention described above. It should be appreciated that the third consumer electronic media device understands the functionality of the proxy device in accordance with the present invention. At step 608, the third consumer electronic media device transmits a command of a first protocol, e.g., Audio Video Control (AV/C), to the proxy device.

At step 610 of FIG. 6, the proxy device receives the first protocol command from the third consumer electronic media device and then translates it into a command of a second protocol, e.g., Common Application Language (CAL). At step 612, the proxy device transmits the second protocol command to the second consumer electronic media device. At step 614, the second consumer electronic media device receives the second protocol command from the proxy device and then performs the second protocol command. At step 616, the proxy device returns information/results to the third consumer electronic media device with regard to the issued command. Process 600 is exited at step 618.

It should be appreciated that during process 600 of FIG. 6, the proxy device is capable of translating many different types of signals in accordance with the present invention. For instance, the proxy device can translate between different: command languages, command transport protocols, graphics formats, text string formats, and the like.

Another proxy service in accordance with the present invention includes the proxy device extending the existing functionality of other consumer electronic media devices. For instance, consider AV/C subunits within a consumer electronic media device which support the NOTIFY ctype for certain commands. They may be implemented with the ability to notify only one other consumer electronic media device (client) on network 5. However, a device such as set-top-box 13, with more RAM and other resources, is able to register itself as the NOTIFY target, and several other clients could register with the proxy device. In effect, the proxy device is extending the functionality of the AV/C subunit's existing NOTIFY mechanism.

Figure 7:
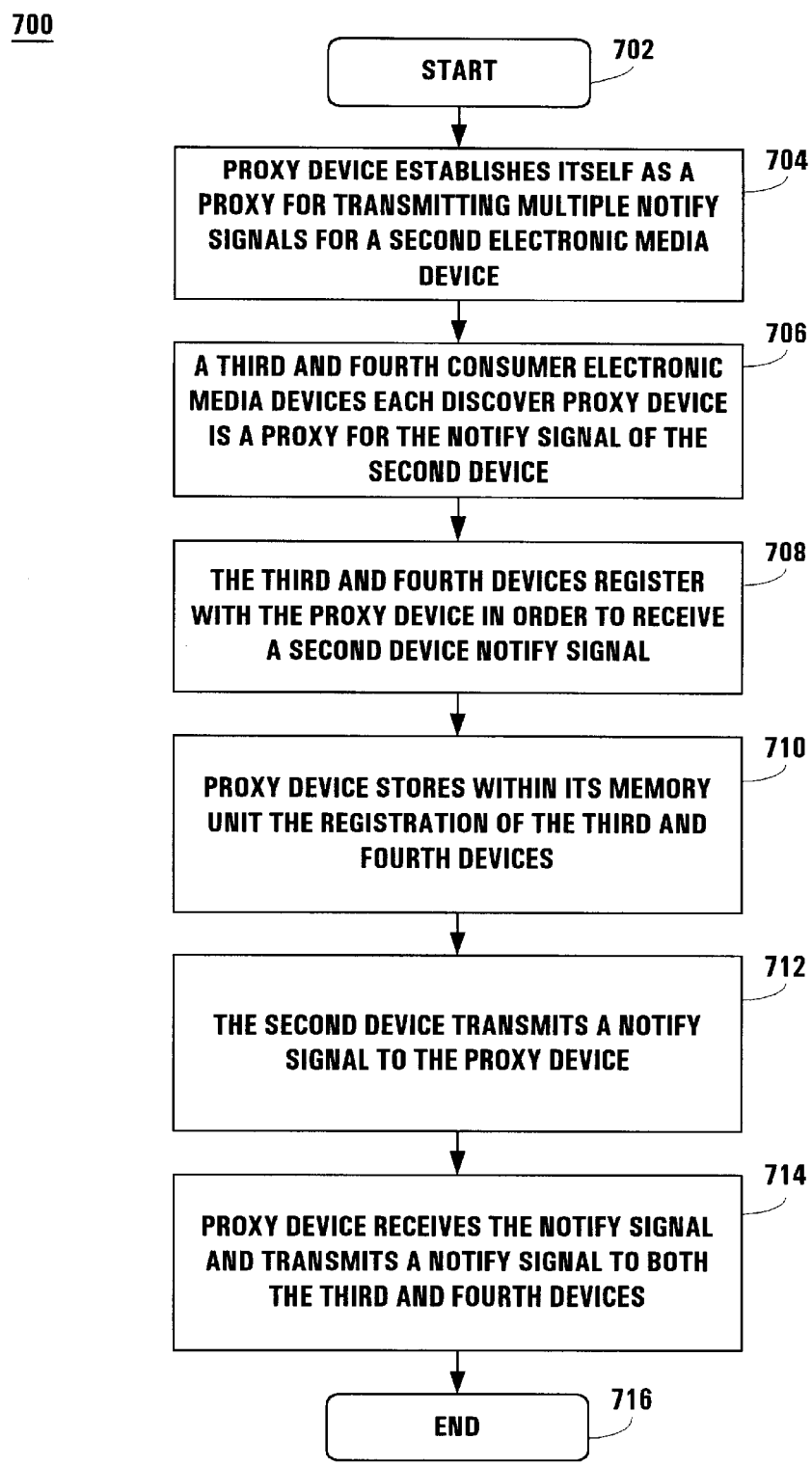
FIG. 7 is a flowchart illustrating steps of a process in accordance with one embodiment of the present invention for enabling a proxy consumer electronic media device to extend an existing functionality of a second consumer electronic media device within the network of FIG. 1.

FIG. 7 is a flowchart illustrating steps of a process 700 in accordance with one embodiment of the present invention for enabling a proxy consumer electronic media device to extend an existing functionality of a second consumer electronic media device within network 5. Specifically, process 700 extends the capability of the second consumer electronic media device to transmit a NOTIFY signal, which is part of the AV/C protocol. But it should be appreciated that a proxy device, in accordance with the present invention, is capable of extending any number of functions of a second consumer electronic media device. Furthermore, the proxy device, in accordance with the present invention, is capable of extending the functions of numerous consumer electronic media devices within network 5. Process 700 is realized as program code stored within computer readable memory units of a proxy consumer electronic media device, a second, third and fourth consumer electronic media devices of network 5. Process 700 begins at step 702 and at step 704, the proxy device (e.g., set-top-box 13) establishes itself as a proxy for transmitting multiple NOTIFY signals of the AV/C protocol for a second consumer electronic media device (e.g., VCR 12). It should be appreciated that one method of accomplishing step 704 in accordance with the present invention is to utilize process 500 of FIG. 5. Furthermore, another method of accomplishing step 704 in accordance with the present invention is to utilize any of the methods described above.

At step 706, a third and fourth consumer electronic media devices (e.g., TV 11 and PC 14) each discover that the proxy device is a proxy for the AV/C NOTIFY signal of the second consumer electronic media device. This process utilizes well known IEEE 1212 communication protocol mechanisms along with methods of the present invention described above. It should be appreciated that the third and the fourth consumer electronic media devices understand the functionality of the proxy device in accordance with the present invention. At step 708, the third and fourth consumer electronic media devices each register with the proxy device in order to receive a NOTIFY signal corresponding to the second consumer electronic media device. At step 710, the proxy device stores within its memory unit the registration of the third and fourth consumer electronic media devices.

At step 712 of FIG. 7, the second consumer electronic media device transmits a NOTIFY signal to the proxy device. At step 714, the proxy device receives the NOTIFY signal from the second consumer electronic media device and then transmits a NOTIFY signal to both the third and fourth consumer electronic media devices. Process 700 is exited at step 716.

Another proxy service in accordance with the present invention includes the proxy device providing new functionality to other consumer electronic media devices. For instance, within IEEE 1212r several new and interesting user interface elements and other mechanisms such as remote driver discovery are being defined. For legacy devices (pre-IEEE 1212r), a proxy device is able to supply some of these elements or services. Moreover, for compliant IEEE 1212r consumer electronic media devices that can only provide limited data, the proxy device can provide additional and "higher quality" data.

Figure 8:
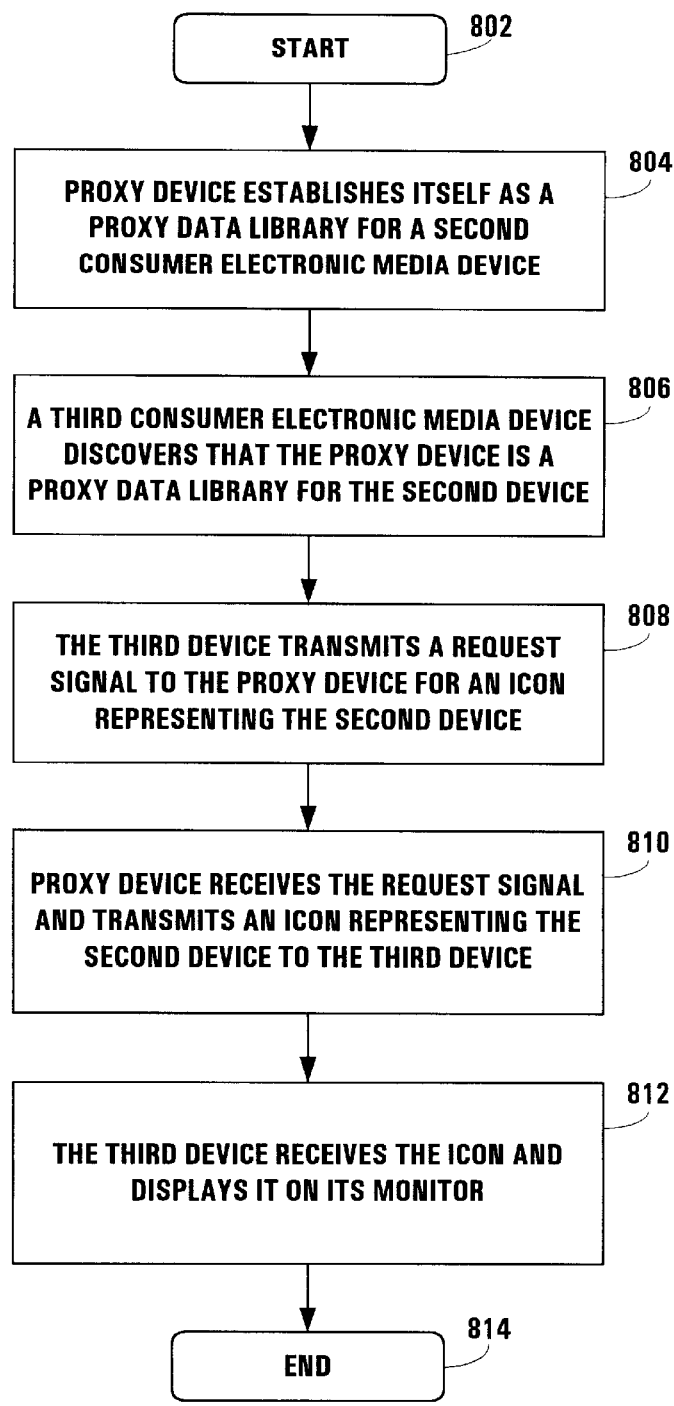
FIG. 8 is a flowchart illustrating steps of a process in accordance with one embodiment of the present invention for enabling a proxy consumer electronic media device to provide additional functionality to a second consumer electronic media device within the network of FIG. 1.

FIG. 8 is a flowchart illustrating steps of a process 800 in accordance with one embodiment of the present invention for enabling a proxy consumer electronic media device to provide additional functionality to a second consumer electronic media device within network 5. Specifically, process 800 provides a data library for the second consumer electronic media device. In other words, the data library provided by the proxy device includes information that cannot otherwise be retrieved from the second consumer electronic media device for various reasons. For example, the information was unable to be stored within the limited memory space of the second consumer electronic media device. Furthermore, the information stored within the memory space of the second consumer electronic media device is antiquated. It should be appreciated that a proxy device, in accordance with the present invention, is capable of providing any number of additional functions to a second consumer electronic media device. Furthermore, the proxy device, in accordance with the present invention, is capable of providing additional functions to numerous consumer electronic media devices within network 5.

Process 800 of FIG. 8 is realized as program code stored within computer readable memory units of a proxy consumer electronic media device, a second and third consumer electronic media devices of network 5. Process 800 begins at step 802 and at step 804, the proxy device (e.g., set-top-box 13) establishes itself as a proxy data library for a second consumer electronic media device (e.g., VCR 12). it should be appreciated that one method of accomplishing steps 804 in accordance with the present invention is to utilize process 500 of FIG. 5. Furthermore, another method of accomplishing step 804 in accordance with the present invention is to utilize any of the methods described above.

At step 806 of FIG. 8, a third consumer electronic media device (e.g., PC 14) discovers that the proxy device is a proxy data library for the second consumer electronic media device. This process utilizes well known IEEE 1212 communication protocol mechanisms along with methods of the present invention described above. It should be appreciated that the third consumer electronic media device understands the functionality of the proxy device in accordance with the present invention. At step 808, the third consumer electronic media device transmits a request signal to the proxy device for an icon representing the second consumer electronic media device.

At step 810, the proxy device receives the request signal and then transmits an icon representing the second consumer electronic media device to the third consumer electronic media device. At step 812, the third consumer electronic media device receives the icon from the proxy device and then displays it on its monitor. Process 800 is exited at step 814.

Figure 9:
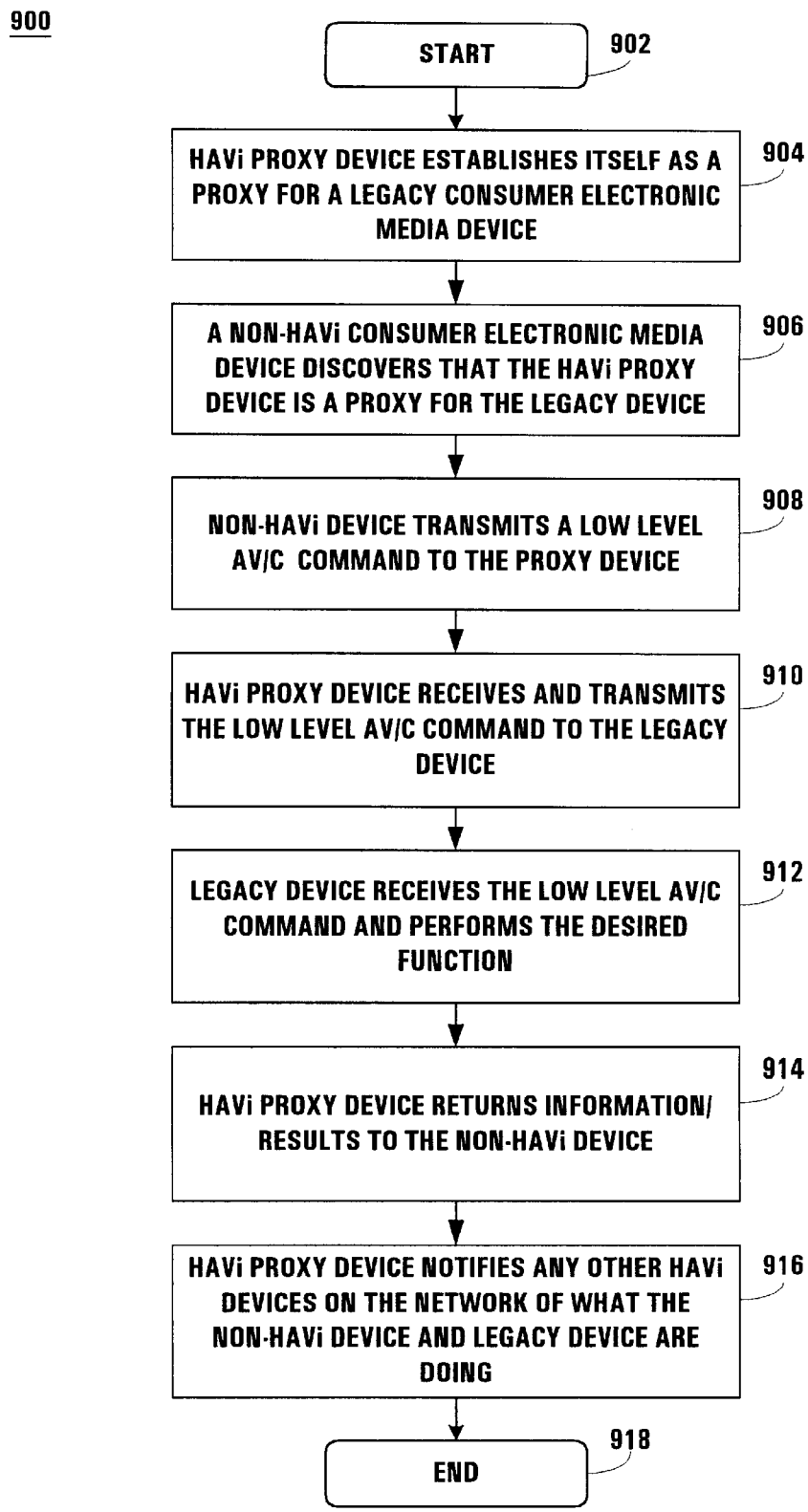
FIG. 9 is a flowchart illustrating steps of a process in accordance with one embodiment of the present invention for enabling a HAVi proxy consumer electronic media device to have more control over non-HAVi consumer electronic media devices within the network of FIG. 1.

FIG. 9 is a flowchart illustrating steps of a process 900 in accordance with one embodiment of the present invention for enabling a HAVi proxy consumer electronic media device to have more control over non-HAVi consumer electronic media devices within network 5. Furthermore, process 900 also enables communication between HAVi and non-HAVi consumer electronic media devices. It should be appreciated that communication between HAVi and non-HAVi consumer electronic media devices is typically not possible. As such, the present invention causes the non-HAVi and HAVi consumer electronic media devices to communicate at the lowest common protocol level (e.g., AV/C, etc.) shared by the two devices. The non-HAVi and HAVi consumer electronic media devices are able to communicate at a common protocol level because they have the capability of using the IEEE 1394 serial bus of network 5. Process 900 is realized as program code stored within computer readable memory units of a HAVi proxy consumer electronic media device, a non-HAVi consumer electronic media device, and a legacy (pre-HAVi) consumer electronic media device of network 5.

Process 900 of FIG. 9 begins at step 902 and at step 904, the HAVi proxy device (e.g., set-top-box 13) establishes itself as a proxy for a legacy consumer electronic media device (e.g., VCR 12), which is only able to receive low level AV/C commands signals. It should be appreciated that one method of accomplishing step 904 in accordance with the present invention is to utilize process 500 of FIG. 5. Furthermore, another method of accomplishing step 904 in accordance with the present invention is to utilize any of the methods described above.

At step 906, a non-HAVi consumer electronic media device (e.g., PC 14) discovers that the HAVi proxy device is a proxy for the legacy consumer electronic media device. This process utilizes well known IEEE 1212 communication protocol mechanisms along with methods of the present invention described above. It should be appreciated that the non-HAVi consumer electronic media device understands the functionality of the HAVi proxy device in accordance with the present invention. At step 908, the non-HAVi consumer electronic media device transmits a low-level AV/C command signal to the proxy device using the IEEE 1212 communication protocol. At step 910, the HAVi proxy device receives the low level AV/C command signal and then transmits it to the legacy device.

At step 912 of FIG. 9, the legacy consumer electronic media device receives the low level AV/C command signal from the HAVi proxy device and then performs the desired function. At step 914, the HAVi proxy device returns information/results to the non-HAVi device with regard to the issued command. At step 916, the HAVI proxy device notifies any other HAVi consumer electronic media devices of network 5 of the activities of the non-HAVi and legacy consumer electronic media devices. In this manner, the other HAVi consumer electronic media devices are updated on the status of the non-HAVi and legacy consumer electronic media devices. As such, the HAVi and non-HAVi consumer electronic media devices are able to operate in conjunction. Process 900 is exited at step 918.

Figure 10:
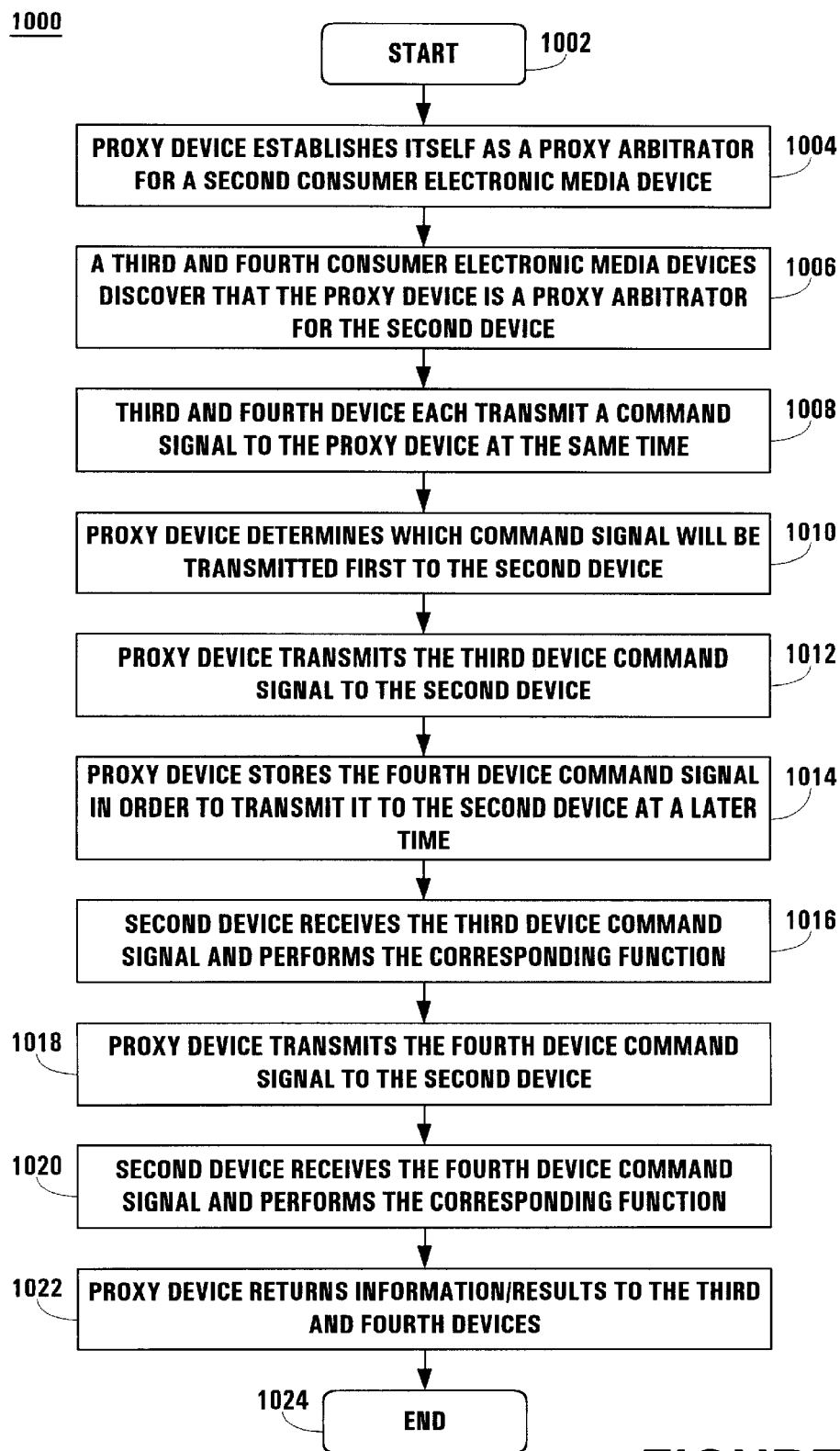
FIG. 10 is a flowchart illustrating steps of a process implemented in accordance with one embodiment of the proxy arbitration functionality of the present invention.

FIG. 10 is a flowchart illustrating steps of a process 1000 implemented in accordance with one embodiment of the proxy arbitration functionality of the present invention. Specifically, process 1000 enables a proxy consumer electronic media device to arbitrate access to a second consumer electronic media device. One possible reason for performing this function is that the second consumer electronic media device is not equipped to receive more than one command at a time. Process 1000 is realized as program code stored within computer readable memory units of a proxy consumer electronic media device, a second, third and fourth consumer electronic media devices of network 5. Process 1000 begins at step 1002 and at step 1004, the proxy device (e.g., set-top-box 13) establishes itself as a proxy arbitrator for a second consumer electronic media device (e.g., VCR 12). It should be appreciated that one method of accomplishing step 1004 in accordance with the present invention is to utilize process 500 of FIG. 5. Furthermore, another method of accomplishing step 1004 in accordance with the present invention is to utilize any of the methods described above.

At step 1006, a third and fourth consumer electronic media devices (e.g., video camera 10 and PC 14) each discovers that the proxy device is a proxy arbitrator for the second consumer electronic media device. This process utilizes well known IEEE 1212 communication protocol mechanisms along with methods of the present invention described above. It should be appreciated that the third and fourth consumer electronic media devices understand the functionality of the proxy device in accordance with the present invention. At step 1008, the third and fourth consumer electronic media devices each transmit a command signal to the proxy device at about the same time. It should be appreciated that the command signals at step 1008 are only used as examples to illustrate the operation of process 1000. As such, the third and fourth consumer electronic media device, in accordance with the present invention, are both able to transmit any type of signal to the proxy device.

At step 1010 of FIG. 10, the proxy device determines which command signal will be transmitted first to the second consumer electronic media device. It should be appreciated that step 1010 can be accomplished by the proxy device in many different ways, in accordance with the present invention. For instance, the proxy device can accomplish step 1010 by utilizing the temporary node IDs of the third and fourth consumer electronic media devices. At step 1012, the proxy device transmits command signal of the third consumer electronic media device to the second consumer electronic media device.

At step 1014, the proxy device stores the command signal of the fourth consumer electronic media device within its memory unit in order to transmit it at a later time to the second consumer electronic media device. At step 1016, the second consumer electronic media device receives the command signal of the third consumer electronic media device from the proxy device and then performs the corresponding function. At step 1018, the proxy device transmits the command signal of the fourth consumer electronic media device to the second consumer electronic media device. At step 1020, the second consumer electronic media device receives the command signal of the fourth consumer electronic media device from the proxy device and then performs the corresponding function. At step 1022, the proxy device returns information/results to the third and fourth devices with regard to their respective issued commands. Process 1000 is exited at step 1024.

Along with the wide variety of proxy services that a proxy device can provide in accordance with the present invention, the proxy device is also able to be established as a proxy for only a particular part or functional subunit of a consumer electronic media device. For instance, the proxy device can establish itself as a proxy for only the tuner functionality of the VCR 12. In this manner, the proxy device in accordance with the present invention has the ability to provide very specific functionality for other consumer electronic media devices of network 5.

Figure 11:
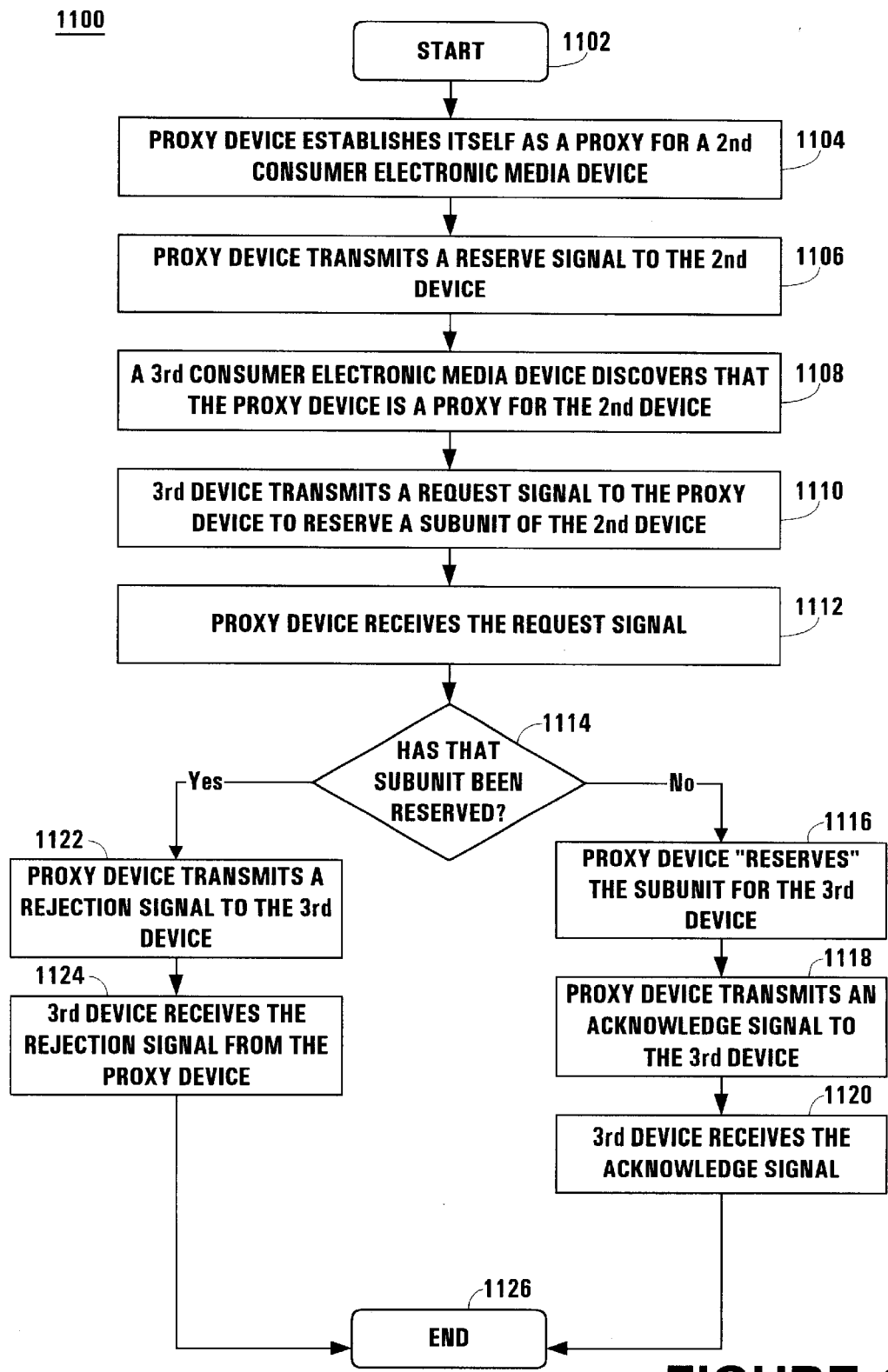
FIG. 11 is a flowchart illustrating steps of a process in accordance with one embodiment of the present invention for enabling a proxy consumer electronic media device to be a proxy for a specific functional subunit of a second consumer electronic media device within the network of FIG. 1.

FIG. 11 is a flowchart illustrating steps of a process 1100 in accordance with one embodiment of the present invention for enabling a proxy consumer electronic media device to be a proxy for a specific functional subunit of a second consumer electronic media device within network 5. Process 1100 is realized as program code stored within computer readable memory units of a proxy consumer electronic media device, a second and third consumer electronic media devices of network 5. Process 1100 begins at step 1102 and at step 1104, the proxy device (e.g., set-top-box 13) establishes itself as a proxy for a second consumer electronic media device (e.g., VCR 12). It should be appreciated that one method of accomplishing step 1104 in accordance with the present invention is to utilize process 500 of FIG. 5. Furthermore, another method of accomplishing step 1104 in accordance with the present invention is to utilize any of the methods described above.

At step 1106, the proxy device transmits a RESERVE command, which is part of the AV/C protocol, to the second consumer electronic media device in order to exclude other consumer electronic media devices from controlling it. At step 1108, a third consumer electronic media device (e.g., PC 14) discovers that the proxy device is a proxy for the second consumer electronic media device. This process utilizes well known IEEE 1212 communication protocol mechanisms along with methods of the present invention described above. It should be appreciated that the third consumer electronic media device understands the functionality of the proxy device in accordance with the present invention. At step 1110, the third consumer electronic media device transmits a request signal to the proxy device to reserve a particular functional subunit of the second consumer electronic media device.

At step 1112 of FIG. 11, the proxy device receives the request signal from the third consumer electronic media device. At step 1114, the proxy device determines whether that particular functional subunit of the second consumer electronic media device has already be reserved by another consumer electronic media device of network 5. At step 1114, if the subunit has already been reserved, process 1100 proceeds to step 1122. If the subunit has not been reserved, process 1100 proceeds to step 1116.

At step 1116, the proxy device reserves the requested subunit of the second consumer electronic media device for the third consumer electronic media device. As such, the third consumer electronic media device has exclusive control over that particular functional subunit of the second consumer electronic media device through the proxy device. At step 1118, the proxy device transmits an acknowledge signal to the third consumer electronic media device. At step 1120, the third consumer electronic media device receives the acknowledge signal from the proxy signal.

At step 1122 of FIG. 11, the proxy device transmits a rejection signal to the third consumer electronic media device indicating that the requested reservation of the particular subunit of the second consumer electronic media device cannot be performed at that time. At step 1124, the third consumer electronic media device receives the rejection signal from the proxy device. Process 1100 is exited at step 1126.

The present invention provides many different advantages to a network of consumer electronic media devices coupled together by the IEEE 1394 serial communication standard, thereby improving the overall experience to the user. For instance, the proxy device in accordance with the present invention has the capability of acting as a translator between two consumer electronic media devices. As such, consumer electronic media devices that were previously unable to communicate are now able to communicate. Furthermore, the proxy device enables HAVi consumer electronic media devices to have greater control over non-HAVi consumer electronic media devices. Additionally, the proxy device enables communication between HAVi and non-HAVi consumer electronic media devices. Another advantage provided by the present invention is that the proxy device can extend existing functionality of consumer electronic media devices. As such, existing devices are improved when used in conjunction with a proxy device in accordance with the present invention.

Another advantage provided by the present invention is that the proxy device can provide new functionality to consumer electronic media devices. Therefore, devices which previously could only provide its user limited functionality are now able to provide much more functionality when used in conjunction with the proxy device in accordance with the present invention. Furthermore, the proxy device can act as an access arbitrator for consumer electronic media devices. For instance, an older VCR may not be equipped to receive command signals from more than one device at a time. As such, a proxy device, in accordance with the present invention, can be established as an access arbitrator or gatekeeper whose function is to only allow one command signal to be sent to the VCR at a time. Another advantage provided by the present invention is that the proxy device can act as a proxy for all or a portion of the functionality of a consumer electronic media device. It should be appreciated that these are only a few of the advantageous proxy services that the proxy device can provide for other consumer electronic media devices, in accordance with the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a network of consumer electronic media devices, a method of communicating between a plurality of consumer electronic media devices, said method comprising the steps of:
   a) establishing a first consumer electronic media device as a proxy device for a second consumer electronic media device within said network of consumer electronic media devices, wherein said plurality of consumer electronic media devices are coupled together as a network by a common bus, wherein step a) comprises the step of storing a data structure in memory of said first consumer electronic media device, wherein said data structure defines proxy services that said first consumer electronic media device performs for said second consumer electronic media device;
   b) transmitting a signal to said first consumer electronic media device indicating a particular proxy service to be performed;
   c) said first consumer electronic media device receiving said signal; and
   d) in response to receiving said signal, said first consumer electronic media device performing said particular proxy service for said second consumer electronic media device.

2. A method as described in claim 1 further comprising the step of e) said first consumer electronic media device transmitting resultant information to said second consumer electronic media device, said resultant information identified in said signal.

3. A method as described in claim 1 wherein said plurality of consumer electronic media devices includes a third consumer electronic media device and wherein said step b) comprises the step of said third consumer electronic media device transmitting said signal and said step d) comprises the step of said first consumer electronic media device transmitting a result signal to said third consumer electronic media device.

4. A method as described in claim 1 wherein said step a) comprises the steps of:
   a1) said first consumer electronic media device discovering said second consumer electronic media device coupled to said common bus;
   a2) said first consumer electronic media device determining a functionality of said second consumer electronic media device;
   a3) said first consumer electronic media device determining whether said first consumer electronic media device can provide a proxy service for said second consumer electronic media device; and
   a4) if said first consumer electronic media device can provide a proxy service for said second consumer electronic media device, said first consumer electronic media device performing said step of storing said data structure in memory of said first consumer electronic media device.

5. A method as described in claim 1 wherein said step a) comprises the steps of:
   a1) a third consumer electronic media device examining said memory of said first consumer electronic media device to determine that said first consumer electronic media device is said proxy device for said second consumer electronic media device; and
   a2) said third consumer electronic media device recording this information within its memory.

6. A method as described in claim 1 wherein said step a) comprises the steps of:
   a1) a third consumer electronic media device examining said memory of said first consumer electronic media device utilizing an IEEE 1212 read only memory (ROM) protocol to determine that said first consumer electronic media device is said proxy device for said second consumer electronic media device; and
   a2) said third consumer electronic media device recording this information within its memory.

7. A method as described in claim 1 wherein said particular proxy service involves said first consumer electronic media device performing a translation on communications between said second consumer electronic media device and a third consumer electronic media device.

8. A method as described in claim 1 wherein said particular proxy service involves said first consumer electronic media device providing a new functionality for said second consumer electronic media device.

9. A method as described in claim 1 wherein said particular proxy service involves said first consumer electronic media device extending an existing functionality of said second consumer electronic media device.

10. A method as described in claim 1 wherein said particular proxy service involves said first consumer electronic media device arbitrating access to said second consumer electronic media device.

11. A method as described in claim 1 wherein said particular proxy service involves said first consumer electronic media device enabling Home Audio Video Interoperability (HAVi) devices to have control over non-HAVi devices.

12. A method as described in claim 1 wherein said particular proxy service involves said first consumer electronic media device enabling non-Home Audio Video Interoperability (HAVi) devices to have control over HAVi devices.

13. A method as described in claim 1 wherein said particular proxy service involves said first consumer electronic media device controlling one subunit of functionality of said second consumer electronic media device.

14. A method as described in claim 1 wherein said particular proxy service involves said first consumer electronic media device providing a data library for said second consumer electronic media device.

15. A method of communicating between a plurality of consumer electronic media devices, said method comprising the steps of:
   a) establishing a first consumer electronic media device as a proxy device for a second consumer electronic media device of said plurality of consumer electronic media devices, wherein said plurality of consumer electronic media devices are coupled together as a network by an IEEE 1394 bus, wherein step a) comprises the step of storing a data structure in memory of said first consumer electronic media device, wherein said data structure defines proxy services that said first consumer electronic media device performs for said second consumer electronic media device;
   b) transmitting a signal to said first consumer electronic media device indicating a particular proxy service to be performed;
   c) said first consumer electronic media device receiving said signal;
   d) in response to receiving said signal, said first consumer electronic media device performing said particular proxy service for said second consumer electronic media device; and
   e) said first consumer electronic media device transmitting resultant information to said second consumer electronic media device, said resultant information identified in said signal.

16. A method as described in claim 15 wherein said plurality of consumer electronic media devices includes a third consumer electronic media device and wherein said step b) comprises the step of said third consumer electronic media device transmitting said signal and said step d) comprises the step of said first consumer electronic media device transmitting a result signal to said third consumer electronic media device.

17. A method as described in claim 15 wherein said step a) comprises the steps of:
 a1) said first consumer electronic media device discovering said second consumer electronic media device coupled to said IEEE 1394 bus;
 a2) said first consumer electronic media device determining a functionality of said second consumer electronic media device;
 a3) said first consumer electronic media device determining whether said first consumer electronic media device can provide a proxy service for said second consumer electronic media device; and
 a4) if said first consumer electronic media device can provide a proxy service for said second consumer electronic media device, said first consumer electronic media device performing said step of storing said data structure in memory of said first consumer electronic media device.

18. A method as described in claim 15 wherein said step a) comprises the steps of:
 a1) a third consumer electronic media device examining said memory of said first consumer electronic media device to determine that said first consumer electronic media device is said proxy device for said second consumer electronic media device; and
 a2) said third consumer electronic media device recording this information within its memory.

19. A method as described in claim 15 wherein said step a) comprises the steps of:
 a1) a third consumer electronic media device examining said memory of said first consumer electronic media device utilizing an IEEE 1212 ROM protocol to determine that said first consumer electronic media device is said proxy device for said second consumer electronic media device; and
 a2) said third consumer electronic media device recording this information within its memory.

20. A method as described in claim 15 wherein said particular proxy service involves said first consumer electronic media device performing a translation on communications between said second consumer electronic media device and a third consumer electronic media device.

21. A method as described in claim 15 wherein said particular proxy service involves said first consumer electronic media device providing a new functionality for said second consumer electronic media device.

22. A method as described in claim 15 wherein said particular proxy service involves said first consumer electronic media device extending an existing functionality of said second consumer electronic media device.

23. A method as described in claim 15 wherein said particular proxy service involves said first consumer electronic media device arbitrating access to said second consumer electronic media device.

24. A method as described in claim 15 wherein said particular proxy service involves said first consumer electronic media device enabling Home Audio Video Interoperability (HAVi) devices to have control over non-HAVi devices.

25. A method as described in claim 15 wherein said particular proxy service involves said first consumer electronic media device enabling non-Home Audio Video Interoperability (HAVi) devices to have control over HAVi devices.

26. A method as described in claim 15 wherein said particular proxy service involves said first consumer electronic media device controlling one subunit of functionality of said second consumer electronic media device.

27. A method as described in claim 15 wherein said particular proxy service involves said first consumer electronic media device providing a data library for said second consumer electronic media device.

28. A communication network comprising:
 a plurality of consumer electronic media devices;
 an IEEE 1394 communication bus coupled to each of said plurality of consumer electronic media devices; and
 a data structure stored within a memory space of a first consumer electronic media device, said data structure containing information defining proxy services to be performed by said first consumer electronic media device for a second consumer electronic media device, said proxy services for causing said first consumer electronic media device to perform a selected proxy service for said second consumer electronic media device in response to signals received over said IEEE 1394 communication bus that indicate said selected proxy service to be performed.

29. A network as described in claim 28 wherein said memory space is a configuration read only memory (ROM) of said first consumer electronic media device.

30. A network as described in claim 28 wherein said selected proxy service involves said first consumer electronic media device performing translations of communications between a third consumer electronic media device and said second consumer electronic media device.

31. A network as described in claim 28 wherein said selected proxy service involves said first consumer electronic media device providing a new functionality for said second consumer electronic media device.

32. A network as described in claim 28 wherein said selected proxy service involves said first consumer electronic media device extending an existing functionality of said second consumer electronic media device.

33. A network as described in claim 28 wherein said selected proxy service involves said first consumer electronic media device arbitrating access to said second consumer electronic media device between said plurality of consumer electronic media devices.

34. A network as described in claim 28 wherein said selected proxy service involves said first consumer electronic media device enabling Home Audio Video Interoperability (HAVi) devices to have control over non-HAVi devices.

35. A network as described in claim 28 wherein said selected proxy service involves said first consumer electronic media device enabling non-Home Audio Video Interoperability (HAVi) devices to have control over HAVi devices.

36. A network as described in claim 28 wherein said second consumer electronic media device contains several subunits and wherein said selected proxy service involves said first consumer electronic media device controlling one subunit of said second consumer electronic media device.

37. A network as described in claim 28 wherein said selected proxy service involves said first consumer electronic media device providing a data library for said second consumer electronic media device.

* * * * *